US008296173B2

(12) United States Patent
Raffel et al.

(10) Patent No.: US 8,296,173 B2
(45) Date of Patent: Oct. 23, 2012

(54) METHOD AND APPARATUS FOR NETWORK-BASED SALES FORCE MANAGEMENT

(75) Inventors: Keith Raffel, Palo Alto, CA (US); Robert M. Schulman, Atherton, CA (US); Dixie Baker, Carmel, CA (US); Robert E. Currie, Hollywood, MD (US); Christine Currie, Hollywood, MD (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

(21) Appl. No.: 12/047,920

(22) Filed: Mar. 13, 2008

(65) Prior Publication Data

US 2008/0162177 A1     Jul. 3, 2008

Related U.S. Application Data

(60) Division of application No. 09/797,053, filed on Feb. 27, 2001, now Pat. No. 7,379,064, which is a continuation of application No. PCT/US99/19766, filed on Aug. 27, 1999.

(60) Provisional application No. 60/098,194, filed on Aug. 27, 1998.

(51) Int. Cl.
*G06Q 10/00* (2012.01)
(52) U.S. Cl. ...................................... 705/7.29
(58) Field of Classification Search .............. 705/7, 7.29
See application file for complete search history.

(56) References Cited

U.S. PATENT DOCUMENTS 4,937,743 A * 6/1990 Rassman et al. .................. 705/8
(Continued)

FOREIGN PATENT DOCUMENTS

EP     467584 A2     1/1992
(Continued)

OTHER PUBLICATIONS

UpShot Corporation Launches First 100% Web-Powered Sales Automation Application. PR Newsire. New York: Mar. 23, 2998 (proquest).*

(Continued)

*Primary Examiner* — Johnna Loftis
(74) *Attorney, Agent, or Firm* — Campbell Stephenson LLP

(57) ABSTRACT

A method and apparatus for network-based sales force automation are provided that meet objectives of increasing sales and marketing efficiency and efficiency of technical and customer support by providing multi-dimensional displays of transactional information to users. Transactional information of deals, contacts, accounts, and leads is provided over the Internet using a Web browser. The information of related transactions is electronically linked, and the transactional information is electronically searchable using custom profiles. The transactional information is accessed and shared among host organization members according to a hierarchy and predefined territories. A Radar Screen Opportunity Display (RSOD) may be selected on which deal objects are displayed that represent the stages in a sales pipeline of corresponding deals. New business information may be selected, wherein automatic notification is provided of new information and changed information relating to transactions, wherein the new business information comprises information on at least one monitored customer Web site. A communication capability is provided that comprises electronic mail, facsimile, telephones, and paging devices, wherein communication is automatically established using transactional information.

22 Claims, 45 Drawing Sheets

| 3250 NAME | 3252 SIZE | 3254 TERRITORY | 3256 COMPLETION DATE | 3258 STAGE (TODAY*) | 3260 STAGE (1 MONTH AGO) | 3262 |
|---|---|---|---|---|---|---|
| 3270 ABC CORP. | $ 50,000 | SE | 1/15/97 | 5 | 3 | |
| 3272 ACME | $ 150,000 | NW | 2/1/97 | 4 | 1 | |
| 3274 WIDGETS INC. | $ 250,000 | NE | 3/1/97 | 3 | 3 | |
| 3276 XYZ CORP. | $ 100,000 | SW | 5/1/97 | 2 | 1 | |
| 3278 TECH LTD. | $ 200,000 | SW | 4/1/97 | 2 | 3 | |
| 3280 ZIPPY CO. | $ 50,000 | NE | 5/1/97 | 3 | 3 | |
| 3282 SUPER STUFF | $ 150,000 | SE | 4/1/97 | 2 | 4 | |

* ASSUME TODAY IS 1/1/97

U.S. PATENT DOCUMENTS

| | | | | |
|---|---|---|---|---|
| 5,237,497 | A | 8/1993 | Sitarski | 705/8 |
| 5,668,993 | A * | 9/1997 | Peters et al. | 718/101 |
| 5,801,680 | A | 9/1998 | Minakuchi | 345/589 |
| 5,826,252 | A * | 10/1998 | Wolters et al. | 707/1 |
| 5,836,011 | A | 11/1998 | Hambrick et al. | 705/8 |
| 5,862,325 | A | 1/1999 | Reed et al. | 709/201 |
| 5,873,068 | A * | 2/1999 | Beaumont et al. | 705/14 |
| 5,966,695 | A | 10/1999 | Melchione et al. | 705/10 |
| 5,974,407 | A | 10/1999 | Sacks | 1/1 |
| 6,034,970 | A | 3/2000 | Levac et al. | 370/466 |
| 6,067,525 | A * | 5/2000 | Johnson et al. | 705/10 |
| 6,101,491 | A | 8/2000 | Woods | 707/696 |
| 6,151,624 | A | 11/2000 | Teare et al. | 709/217 |
| 6,169,534 | B1 * | 1/2001 | Raffel et al. | 345/581 |
| 6,460,038 | B1 | 10/2002 | Khan et al. | 1/1 |
| 6,581,040 | B1 | 6/2003 | Wright et al. | 705/8 |
| 6,609,100 | B2 | 8/2003 | Smith et al. | 705/8 |
| 6,633,910 | B1 | 10/2003 | Rajan et al. | 709/224 |
| 6,665,648 | B2 | 12/2003 | Brodersen et al. | 705/7 |
| 6,672,507 | B1 | 1/2004 | Walker et al. | 235/456 |
| 6,678,714 | B1 * | 1/2004 | Olapurath et al. | 718/104 |
| 7,379,064 | B2 * | 5/2008 | Raffel et al. | 345/440 |

FOREIGN PATENT DOCUMENTS

| | | | | |
|---|---|---|---|---|
| FR | 2658628 A1 | 8/1991 | | 705/9 |
| JP | 03170257 A1 | 7/1991 | | 705/8 |
| WO | WO 97/15023 | 4/1997 | | |
| WO | WO 97/26610 | 7/1997 | | |
| WO | WO 99/00749 A | 1/1999 | | |
| WO | WO 00/13122 | 3/2000 | | |

OTHER PUBLICATIONS

UpShot—http://localhost/UpShot/Help/User/intro.htm Jul. 21, 1998.* www.onyx.com—Onyx screenshots—Jul. 15, 1998.*

Flanagan, Patrick. Getting the paper out of the marketing and sales pipeline. Management Review. New York: Jul. 1995. vol. 84, Iss. 7; p. 53, 3 pages. (proquest).*

Dulaney, Ken. American Demographics Tools Supplement, pp. 56-63. Oct. 1996 from dialog; file 15; 01307085.*

"Onyx Customer Center", http://www.onys.com/products/OCC/defaultasp. Jul. 15, 1998, 3 pages.

"Pivotal Web Client", Jul. 15, 1998, http://pivotal.com/Web.sub.--Client_sub.--home.htm.cited 3 pgs.

"Press Release", Aug. 20, 1998, 11 pages. http://www.partnerward.com/enhanced/news/news.html.

Campanelli M., "Sound the Alarm," Sales & Marketing Management, No. Part 02, Dec. 1, 1994., p. 20-22, 24-25, XP002034775.

Falcone, R., et al., "Automating the Business—AT&T Tackles Its Toughest Customer," AT&T Technology, US American Telephone &Telegraph Co., Short Hills, NJ, vol. 4, No. 1, Jan. 1, 1989, p. 36-43.

"Xcellenet and Trilogy announce partnership to extend front-office solution for mobile professionals," www.makos.com "Online", Mar. 4, 1998, pp. 1-2, retrieved from the Internet: http://www.makos.com/trilogy/news/press/releases/pr970728xcellenet.html>, retrieved on Jan. 11, 2000.

"Fusion of an In-House Information Communication System and Mobile Computing—Business Operation and Introduction of a Mobile System," Mobile Media Magazine, K.K. C. media, Apr. 26, 1996, vol. 15, pp. 77-82.

Masami Yamatani, "Sales Force Automation That Raises the Productivity of a Sales Department at a Dash," Nikkei Information Strategy, Nikkei Business Publications, Inc., Feb. 1, 1995, No. 35, pp. 102-113.

Masanobu Ando, "Reconsideration of Groupware: No. 2 Sales Supporting System "SFA"," Business Communication, vol. 35, No. 3, pp. 77-81.

Translation of Reasons for Refusal for Japan Application No. 2000-568038, Apr. 28, 2009, pp. 1-5.

* cited by examiner

| LEVEL OF RIGHTS | DEALS | NOTIFICATIONS |
|---|---|---|
| TERRITORY OWNER  702 | Has operational responsibility for deals and accounts assigned to the territory. Can create, view, modify, report on, and delete deals associated with the territory. Can create appointments and To Do's associated with deals in the territory. | Can receive notifications when accounts, contacts, and deals associated with the territory are created or modified, and when deals are reassigned to the owner's territory, or territory ownership is changed. Notifications for owners can be specified independently of those given to others assigned to the territory. |
| FULL ACCESS  704 | Can create, view, modify, report on, and delete deals associated with the territory. Can create appointments and To Do's associated with deals in the territory. | Can receive notifications when accounts, contacts, and deals associated with the territory are created or modified, and when deals are reassigned to the owner's territory, or territory ownership is changed. |
| VIEW ACCESS  706 | Can view, and report on deals associated with the territory. Can create appointments and To Do's associated with deals in the territory. | Same as for Full Access. |
| NO ACCESS  708 | Cannot view, or report on deals associated with the territory. Cannot create appointments or To Do's associated with deals in the territory. | Receives no notification. |

FIG. 7

| FIELD NAME | FIELD TYPE | REQUIRED? | COMMENTS |
|---|---|---|---|
| Account Name | Short Text | Yes | |
| Web Page Address | URL | No | |
| Industry | List | No | List of industry categories. Default = "(none)". |
| Territory | Built-in Link | No | Automatically generated list of current territories. |
| Account Phone Number | Phone | No | |
| Annual Revenue | Currency | No | |
| Number of Employees | Number | No | |
| SIC Code | Short Text | No | Intended to store Standard Industry Code number as defined by US Department of Commerce. |
| Account Address | Address Group | No | |

FIG. 10

| FIELD NAME | FIELD TYPE | REQUIRED? | COMMENTS |
|---|---|---|---|
| Contact Name | Name Group | Yes | |
| Account | Built-in Link | No | Automatically generated list of current active accounts. |
| Work Phone | Phone | No | |
| Fax Number | Phone | No | |
| E-mail Address | E-mail | No | |
| Home Phone | Phone | No | |
| Cell Phone Number | Phone | No | |
| Title | Short Text | No | |
| Territory | Built-in Link | No | Automatically generated list of current territories. |
| Address | Address Group | No | |
| Assistant's Name | Name Group | No | |
| Assistant's Phone | Phone | No | |
| Assistant's E-mail | E-mail | No | |

FIG. 11

| FIELD NAME | FIELD TYPE | REQUIRED? | COMMENTS |
|---|---|---|---|
| Deal Description | Short Text | Yes | |
| Account | Built-In Link | Yes | Automatically generated list of current accounts. |
| Projected Close Date | Date | Yes | |
| Stage | List | Yes | List of deal stages. Lead and Closed stage values should be modified only with caution. Default = "Lead". |
| Size | Currency | Yes | |
| Rating | List | Yes | List of rating categories. Default = first item on list. |
| Probability of Closing | Percent | Yes | |
| Territory | Built-In Link | Yes | Automatically generated list of current territories. |
| Source | List | Yes | List of currently defined deal sources. Default = first item on list. |
| Qualifications | Long String | No | |

FIG. 12

|  | NOTIFY TERRITORY OWNER | NOTIFY TERRITORY MEMBERS |
|---|---|---|
| NOTIFY WHEN: | | |
| A NEW ACCOUNT is Created | ☒ | ☒ |
| An ACCOUNT is MODIFIED | ☒ | ☐ |
| ▷ Fields to Monitor For Modification | | |
| A NEW DEAL is Created | ☒ | ☒ |
| A DEAL is MODIFIED — 1402 | ☒ | ☐ |
| ▽ Fields to Monitor For Modification | | |
| ☐ Description | | |
| ☐ Territory | | |
| ☐ Rating — 1404 | | |
| ☒ Stage | | |
| ☐ Source — 1406 | | |
| ☒ Deal Status | | |
| ☒ Prob. — 1408 | | |
| ☒ Proj. Close — 1410 | | |
| ☐ Size | | |
| ☐ Qualifications | | |
| ☐ Account | | |
| DEALS are REASSIGNED to a Different Territory | ☒ | ☒ |
| A NEW CONTACT is Created | ☐ | ☐ |
| A CONTACT is MODIFIED | ☒ | ☐ |
| ▷ Fields to Monitor For Modification | | |
| A TERRITORY'S OWNERSHIP is MODIFIED | | ☒ |

FIG. 14

| NOTIFY WHEN: | NOTIFY CREATOR | NOTIFY RECIPIENT(S) |
|---|---|---|
| A NEW TO DO is Created | | ☑ |
| A TO DO is MODIFIED by its Creator | | ☑ |
| A NEW APPOINTMENT is Created | | ☑ |
| An APPOINTMENT is MODIFIED by its Creator | | ☑ |
| A TO DO is CANCELLED by its Creator | | ☑ |
| An APPOINTMENT is CANCELLED by its Creator | | ☑ |
| An APPOINTMENT REQUEST is DECLINED by the Recipient(s) | ☑ | |
| A TO DO becomes OVERDUE | ☐ | |

FIG. 15

| | |
|---|---|
| NEW Button <br> ⊕ NEW... | Use to create a new lead, account, to do item, contact, appointment, or deal, using the New Leads screen, New Accounts screen, New To Do screen, New Contacts screen, New Appointment screen, or New Deals screen. <br><br> Click on the plus sign (+) to create a new account. Or, move the cursor anywhere over the button to bring up a list of all record types that can be created. Click the desired option. |
| SHOW drop-down menu | Select the profile to use to determine which accounts are displayed in the ACCOUNT LIST. Choose Active Accounts, Inactive Accounts, All Accounts, or any custom-defined profile. |
| RECORDS control | Use to specify which accounts appear on the current page. |
| SEARCH button | Click to search for accounts matching the criteria which you can specify on the Search screen. |
| COMMUNICATE button | Click to send communications (mail, fax, e-mail, quote, labels, or envelopes) to contacts associated with the selected accounts. |
| PROFILE button | Click to display the Account Profiles screen, which can be used to create, view, edit, and delete profiles. |
| ACCOUNT LIST | Displays accounts according to the selection in the SHOW drop-down menu. Sort the Account List by clicking on a column heading and use the ACCOUNT LIST sort arrows to determine the sort order. <br><br> Click on an ACCOUNT LIST item twist-down to display detail information about the account. |
| ACCOUNT LIST Item twist-down ▷ ▽ | Click a right-pointing twist-down ( ▷ ) to display details about an account. The twist-down will point downward when details are displayed. Click the downward-pointing twist-down ( ▽ ) to hide the details. |
| ACCOUNT LIST sort arrows ▽ △ | Indicates which direction a column is being sorted: descending ( △ ) or ascending ( ▽ ). <br><br> To sort column, click on the column heading. |
| EDIT icon ✏ | Click the "pencil" by an ACCOUNT LIST item to display the Edit Account screen and edit or delete an account. |

FIG. 17

| | |
|---|---|
| ACCOUNT NAME text field | Type the name of the account. |
| SAVE ACCOUNT button | Click to save this account to the database. After the account has been saved, the screen will clear and another account can be entered. |
| CLEAR FORM button | Click to clear all the entered information without saving it. |
| CLOSE button | Click to close the screen without saving the account. Use this button after all accounts have been entered and saved with the SAVE ACCOUNT button. |

FIG. 18

| | |
|---|---|
| NEW MESSAGE button | Click to display the New Message screen and to start a new discussion topic. |
| DELETE ITEM button | Click to delete items with DELETE checkboxes selected. |
| SHOW drop-down menu | Select the time period for which you want messages displayed. |
| SEARCH button | Click to display the Search for Message screen and find a certain topic heading or word within the body of a message. |
| DELETE checkbox | Click to mark the item for deletion when the DELETE ITEMS button is clicked. |
| REPLY link | At the end of each posted comment, the word REPLY... is underlined. Click on this link to display the New Reply screen and reply to this topic. |
| ATTACHMENT icon | Click to save or read a file attached to a reply. |
| DETAIL twist-down △ ▷ | Click to display replies to topic messages. Click again to hide the replies. |

FIG. 19

| | |
|---|---|
| TOPIC text field | If you are starting a new topic, this field appears blank. Type in the topic title.<br>If responding to an existing topic, the topic name will display here. |
| MESSAGE text field | If starting a new topic, this field appears blank. Type in the message.<br>If replying to an existing topic, the text of the message to which responding will display here. Use the REPLY text field to respond to the message. |
| REPLY text field | If replying to a message, type reply here. |
| ATTACHMENTS list | Displays a list of attachments to this message. Attachments are associated with a message by clicking the ADD button. |
| ADD button | Click to display a File Open dialog box and select attachment to associate with this message. |
| SAVE MESSAGE/ REPLY button | Click to save this message and post it on the Bulletin board screen. |
| CANCEL button | Click to discard this message without saving it, close the screen and return to the Bulletin board screen. |

FIG. 20

| | |
|---|---|
| MATCH drop-down menu | Select the type of match:<br><br>Partial - The records containing the values in the search fields.<br>Start - The records beginning with the values in the search fields. |
| TOPIC text field | Enter the text or numbers used to search topics. |
| MESSAGE text field | Enter the text or numbers used to search messages. |
| PERFORM SEARCH button | Click to begin the search. |
| CANCEL SEARCH button | Click to return to the Bulletin board screen and cancel the search. |

FIG. 21

| | |
|---|---|
| ACCOUNT field/ FIND button | Type the full name or the first few letters of the account associated with this record. Click the FIND... button to display a list of matching account names on a drop-down menu. Select the desired account name from the menu. |
| DEAL drop-down menu | Select the deal to associate with this appointment. Only deals associated with the selected account are displayed. |
| CONTACTS scroll box | Select contact(s) to include in this appointment by clicking the contact name or names. The contacts on the menu are the contacts associated with the account entered in the Account field. To select or deselect multiple contacts, use control-click. |
| CO-WORKERS scroll box | Select co-worker(s) to include in this appointment by clicking the co-worker's name or names. To select or deselect co-workers, use control-click. |
| ON date field | Type in the date of this appointment. |
| CALENDAR button | Click to display a calendar from which to select an appointment date to be entered in the ON field. |
| FROM drop-down menu | Select the time the appointment begins from the HOUR, MINUTE, and AM/PM drop-down menus. |
| TO drop-down menu | Select the time the appointment ends from the HOUR, MINUTE, and AM/PM drop-down menus. |
| DESCRIPTION scroll box | Type a description of the appointment. This description is visible to everyone who has access to the Calendar. |
| NOTE scroll box | Type a note about the appointment. This note is visible only to the creator of the appointment. |
| ATTACHMENTS list | Displays a list of attachments associated with this appointment. |
| ADD button | Click to display a File Open dialog box and select an attachment to associate with this appointment. You can attach any type of Windows file. |
| SAVE button | Click to save the appointment and notify invited co-workers of the appointment. |
| CANCEL button | Click to close the screen without saving the appointment. |

FIG. 23

| | |
|---|---|
| NEW Button<br><br>(+ NEW...) | Use to create a new lead, deal, to do item, account, appointment, or contact, using the New Leads screen, New Accounts screen, New To Do screen, New Contacts screen, New Appointment screen, or New Deals screen.<br><br>Click on the plus sign (+) to create a new contact. Or, move the cursor anywhere over the button to bring up a list of all record types that can be created. Click the desired option. |
| SHOW<br><br>drop-down menu | Select the profile to use to determine which contacts are displayed in the CONTACT LIST. Choose Active Contacts, Inactive Contacts, All Contacts, Personal Contacts, or any custom-defined profile. |
| RECORDS control | Use to specify which contacts appear on the current page. |
| SEARCH button | Click to search for contacts matching the criteria which you can specify on the Search screen. |
| COMMUNICATE button | Click to send communications (mail, fax, e-mail, quote, labels, or envelopes) to the selected accounts. |
| PROFILE button | Click to display the Contact Profiles screen, which can be used to create, view, edit, and delete profiles. |
| CONTACT LIST | Displays contacts according to the selection in the SHOW drop-down menu. Sort the Contact List by clicking on a column heading and use the CONTACT LIST sort arrows to determine the sort order.<br><br>Click on an CONTACT LIST item twist-down to display detail information about the contact. |
| CONTACT LIST item twist-down<br><br>▷ ▽ | Click on a right-pointing twist-down (▷) to display details about a contact. The twist-down will point downward when details are displayed. Click the downward-pointing twist-down (▽) to hide the details. |
| CONTACT LIST sort arrows<br><br>▽ △ | Indicates which direction a column is being sorted: descending (△) or ascending (▽).<br><br>To sort column, click on the column heading. |
| EDIT icon<br><br>✎ | Click the "pencil" by a CONTACT LIST Item to display the Edit Contact screen and edit or delete an account. |

*FIG. 24*

| | |
|---|---|
| NAME | Enter the contact's name by selecting a salutation (such as Ms. or Dr.) from the SALUTATION drop-down menu, tying the first name into the FIRST text box, typing a middle initial into the M. I. text box, and typing the last name into the LAST text box. |
| PERSONAL checkbox | Click to make this contact personal. |
| ACCOUNT/field FIND... button | Type the full name or the first few letters of the account associated with this record. Click the FIND... button to display a list of matching account names on a drop-down menu.<br><br>Select the desired account name from the menu. |
| GET ACCOUNT ADDRESS button | Click to retrieve the address information for the account associated with this contact. Use this feature only if the contact shares the same address as the account. |
| SAVE CONTACT button | Click to save this contact to the database. |
| SAVE & ADD DEAL button | Click to save this contact and open a New Deal screen with that account name and associated contact filled in. |
| CLEAR FORM button | Click to clear the entered information without saving it. |
| CLOSE button | Click to close the screen without saving the contact. Use this button after you have entered and saved all your contacts with the SAVE CONTACT button. |

FIG. 25

| | |
|---|---|
| NEW Button<br><br>(+ NEW...) | Use to create a new lead, account, to do item, contact, appointment, or deal, using the New Leads screen, New Accounts screen, New To Do screen, New Contacts screen, New Appointment screen, or New Deals screen.<br><br>Click on the plus sign (+) to create a new deal. Or, move the cursor anywhere over the button to bring up a list of all record types that can be created. Click the desired option. |
| SHOW<br><br>drop-down menu | Select the profile to use to determine which deals are displayed in the DEAL LIST. Choose Active Deals, All Deals, Closed Deals, Inactive Deals, Leads, Open Deals, or any custom-defined profile. |
| RECORDS control | Use to specify which deals appear on the current page. |
| SEARCH button | Click to search for deals matching the criteria which you can specify on the Search screen. |
| COMMUNICATE button | Click to send communications (mail, fax, e-mail, quote, labels, or envelopes) to the selected deals. |
| PROFILE button | Click to display the Deal Profiles screen, which can be used to create, view, edit, and delete profiles. |
| DEAL LIST | Displays deals according to the selection in the SHOW drop-down menu. Sort the Deal List by clicking on a column heading and use the DEAL LIST sort arrows to determine the sort order.<br><br>Click on an DEAL LIST item twist-down to display detail information about the deal. |
| DEAL LIST item twist-down<br>▷ ▽ | Click on a right-pointing twist-down (▷) to display details about a deal. The twist-down will point downward when details are displayed. Click the downward-pointing twist-down (▽) to hide the details. |
| DEAL LIST sort arrows<br>▽ △ | Indicates which direction a column is being sorted: descending (△) or ascending (▽).<br><br>To sort column, click on the column heading. |
| EDIT icon<br>✎ | Click the "pencil" by a DEAL LIST Item to display the Edit Deal screen and edit or delete an deal. |

FIG. 26

| | |
|---|---|
| ACCOUNT field/ FIND button | Type the full name or the first few letters of the account associated with this record. Click the FIND... button to display a list of matching account names on a drop-down menu. Select the desired account name from the menu. |
| CONTACTS drop-down menu | Select the contact(s) with which this deal is associated. This list appears after the account has been entered in the ACCOUNT field. |
| DESCRIPTION text field | Enter a short description of this deal. This description is used to identify the deal on the Deal List. |
| PROJECTED CLOSE date field | Enter the date this deal is projected to close. You can also click the Calendar button that appears beside the field and select your date from the pop-up calendar that appears. |
| STAGE drop-down menu | Select the stage of this deal. For example, Lead, Qualified, or In Negotiation. |
| RATING drop-down menu | Select the rating of this deal. For example, Hot, Medium, Cold. |
| PROBABILITY drop-down menu | Enter the percentage probability of this deal closing. |
| TERRITORY drop-down menu | Select the territory associated with this deal. |
| SOURCE drop-down menu | Select the source of this deal. |
| SIZE currency field | Type the estimated revenue to be generated by the deal. |
| SAVE DEAL button | Click to save this deal to the database. |
| CLEAR FORM button | Click to clear all entered information without saving it. |
| CLOSE button | Click to close the screen without saving the deal. Use this button after you have entered and saved all your deals withe the SAVE DEAL button. |

FIG. 27

| ACCOUNT INFORMATION | Enter the specified new account information. Each new lead must be associated with an account. Fields that are underlined are required information. A new account will be created from this information. |
|---|---|
| NO CONTACT INFORMATION checkbox | Click if there is no contact currently associated with this lead. |
| CONTACT INFORMATION | Enter the specified contact information, if available. |
| DEAL INFORMATION | Enter any available lead information. |
| SAVE LEAD button | Click to save this lead. After the lead has been saved, the screen will clear and you can enter another lead. |
| CLEAR FORM button | Click to clear all the information without saving it. |
| CLOSE button | Click to close the screen without saving the lead. |

FIG. 28

| | |
|---|---|
| SHOW drop-down menu | Select the scale to which deals should be mapped: Probability of Closing, Days Until Close, or Deal Stages. |
| FOR drop-down menu | Select the type of deals to be displayed: Active, All, Closed, Inactive, Leads, or a custom profile on the menu. You can also create a new profile. |
| FROM date field | Appears when the Days Until Close option is selected from the SHOW drop-down menu.<br><br>Enter a start date as an anchor (center of the RSOD) in determining the amount of time until a deal is projected to close.<br><br>You can type in the date or use the CALENDAR icon to display a pop-up calendar from which you can select the date.<br><br>After entering a date, click the SET button to set the date. |
| RECORD control | Displays when there are more than 12 items displayed on the RSOD. |
| DEAL circles | A deal is represented on the RSOD Screen as a circle. |
| TERRITORIES legend | Indicates the color associated with each territory. |

FIG. 29

| NAME | SIZE | TERRITORY | COMPLETION DATE | STAGE (TODAY*) | STAGE (1 MONTH AGO) |
|---|---|---|---|---|---|
| ABC CORP. | $50,000 | SE | 1/15/97 | 5 | 3 |
| ACME | $150,000 | NW | 2/1/97 | 4 | 1 |
| WIDGETS INC. | $250,000 | NE | 3/1/97 | 3 | 3 |
| XYZ CORP. | $100,000 | SW | 5/1/97 | 2 | 1 |
| TECH LTD. | $200,000 | SW | 4/1/97 | 2 | 3 |
| ZIPPY CO. | $50,000 | NE | 5/1/97 | 3 | 3 |
| SUPER STUFF | $150,000 | SE | 4/1/97 | 2 | 4 |

* ASSUME TODAY IS 1/1/97

3510 — SCALE

.25 INCH DIAMETER PER $50,000 DEAL SIZE
.5 INCH DISTANCE FROM CENTER PER 1 MONTH OF LEAD TIME
1 INCH OF TAIL PER STAGE MOVED IN PAST MONTH

3520 — NOTES

STAGES ARE FROM 1 TO 5, WHERE 1 IS THE BEGINNING AND 5 IS THE TARGET, SUCH AS GETTING A DEAL BOOKED.

3530 — REGIONS ARE GROUPED IN QUADRANTS:

- NW IN TOP LEFT
- NE IN TOP RIGHT
- SW IN BOTTOM LEFT
- SE IN BOTTOM RIGHT

FIG. 32

| NAME | SIZE | TERRITORY | COMPLETION DATE | STAGE (TODAY*) | STAGE (1 MONTH AGO) |
|---|---|---|---|---|---|
| ABC CORP. | $ 50,000 | SE | 1/15/97 | 5 | 3 |
| ACME | $ 150,000 | NW | 2/1/97 | 4 | 1 |
| WIDGETS INC. | $ 250,000 | NE | 3/1/97 | 3 | 3 |
| XYZ CORP. | $ 100,000 | SW | 5/1/97 | 2 | 1 |
| TECH LTD. | $ 200,000 | SW | 4/1/97 | 2 | 3 |
| ZIPPY CO. | $ 50,000 | NE | 5/1/97 | 3 - CLOSED | 3 |
| SUPER STUFF | $ 150,000 | SE | 4/1/97 | 2 | 4 |

* ASSUME TODAY IS 1/1/97

FIG. 34

| | |
|---|---|
| 3402 — NAME: | XYZ CORP. |
| 3404 — ADDRESS: | 123 Q STREET |
| | PALO ALTO, CA 94301 |
| 3406 — PHONE: | (415) 321-1234 (MAIN) |
| | (415) 321-1239 (FAX) |
| 3408 — INDUSTRY: | PHARMACEUTICALS |
| 3410 — EMPLOYEES: | 1135 |
| 3412 — REVENUE (1996): | $177MM |
| 3414 — CREDIT RATING: | A |
| 3416 — URL: | http:\\www.xyz.com |
| 3418 — TERRITORY: | SW |
| 3420 — DEAL SIZE: | $100,00 |
| 3422 — EXPECTED CLOSE: | 5/1/97 |
| 3424 — STAGE (AS OF 1/1/97): | 2 |

|  | FIND | SEARCH | PROFILES |
|---|---|---|---|
| Retrieve records from multiple tables at once | Yes | No | No |
| Search key fields (Account Name, Deal Description, Contact Name) | Yes | Yes | Yes |
| Search Non-key data fields | No | Yes | Yes |
| Within a single record type, search on multiple fields at once | No | Yes | Yes |
| Advanced search criteria | No | No | Yes |
| Save criteria for future use | No | No | Yes |
| Flexibility (1 = most configurable) | 3 | 2 | 1 |
| Quickness and ease of use (1 = quickest to setup and use) | 1 | 2 | 3 |

FIG. 37

| | |
|---|---|
| ACCOUNTS checkbox | Click to include account records in the search. |
| CONTACTS checkbox | Click to include contact records in the search. |
| DEALS checkbox | Click to include deal records in the search. |
| SCOPE drop-down menu | Select whether the records should contain, start with, exactly match the text in the FIND field. |
| FIND TEXT box | Type the text to be found. |
| GO! button | Click to find the specified text. |
| RESULTS box | Displays the results of the Find search. Records matching the FIND text field are displayed in up to three groups (accounts, contacts, and deals). Each record is underlined so that you can hyperlink to a detail view of it. |

FIG. 38

| | |
|---|---|
| NAME text field | Type the name of the profile. This value will appear in the SHOW drop-down menu on the list screen. |
| DESCRIPTION text field | If desired, type a longer description of the profile. |
| PROFILE ACCESS drop-down menu | Select the access type from the drop-down menu.<br><br>Select "private" if you are the only person who will be using the profile. The profile will display on your list screen SHOW drop down menu only.<br><br>Select "shared" to allow co-workers to use the profile. The profile will appear on the SHOW drop-down menu of all co-workers. |
| PROFILE SELECTION fields and RESTRICT checkboxes | Define your selection criteria. Click a RESTRICT checkbox to choose a field to use as part of the selection criteria. Then define the selection criterion for that field. |
| SAVE PROFILE button | Click to save the profile and return to the list screen from which you came. The profile you created will be in effect and will be displayed on the SHOW drop-down menu. |
| CANCEL button | Click to exit the New Profile screen without saving the profile. |

FIG. 40

| | |
|---|---|
| NEW Button <br><br> (+ NEW...) | Use to create a new lead, account, to do item, contact, appointment, or deal, using the New Leads screen, New Accounts screen, New To Do screen, New Contacts screen, New Appointment screen, or New Deals screen. <br><br> Click on the plus sign (+) to create a new To-Do Item. Or, move the cursor anywhere over the button to bring up a list of all record types that can be created. Click the desired option. |
| SHOW <br><br> drop-down menu | Select the profile to use to determine which to do items are displayed in the TO DO LIST. Choose All my open to dos, My open to dos-Next 7 days, My open to dos-Next 30 days, My closed to dos, Open to dos I've assigned to others, or Closed to dos I've assigned to others. |
| RECORDS control | Use to specify which to do items appear on the current page. |
| TO DO LIST | Displays your to do items according to the selection in the SHOW drop-down menu. You can sort the To Do List by clicking on a column heading and use the TO DO List sort arrows to determine the sort order. <br><br> Click on an TO DO LIST item twist-down to display detail information about the do. |
| DONE checkbox | Click to indicate the to do item has been completed. <br><br> Clicking the DONE checkbox will also display a Task Completed screen that enables you to update information and specify when the item was completed. |
| TO DO LIST item twist-down ▷ ▽ | Click on a right-pointing twist-down (▷) to display details about a to do. The twist-down will point downward when details are displayed. Click the downward-pointing twist-down (▽) to hide the details. |
| TO DO LIST sort arrows ▽ △ | Indicates which direction a column is being sorted: descending (△) or ascending (▽). <br><br> To sort column, click on the column heading. |
| EDIT icon ✎ | Click the "pencil" by a TO DO LIST Item to display the To Do screen and edit or delete a to do. |

*FIG. 41*

| | |
|---|---|
| ACCOUNT field/ FIND button | Type the full name or the first few letters of the account associated with this record. Click the FIND... button to display a list of matching account names on a drop-down menu. Select the desired account name from the menu. |
| CONTACT drop-down menu | Select the contact(s) you want to associate with this to do item. The menu displays all the contacts associated with the account specified in the ACCOUNT field or you personal contacts, if no account was selected. You can select or deselect multiple contacts by using control-click. |
| DEAL drop-down menu | Select the deal you want to associate with this to do item. If you did not select an account, the Deal menu will not be displayed. |
| FOR drop-down menu | Select the co-worker to whom this to do item is to be assigned. Select yourself (the default) if the to do item is for you. |
| DUE BY date field | Enter the due date for this item. |
| AT DROP-DOWN menus | Select the time this to do item is due from the HOUR, MINUTE, and AM/PM drop-down menus. |
| TYPE OF TASK drop-down menus | Select the type of tasks this to do item is: Call, E-mail, Fax, Meeting, Fulfillment, Quote, Visit, or Other. |
| DESCRIPTION scroll box | Type a description of this to do item. A description reminds you or tells your co-worker exactly what needs to be done. |
| LEVEL drop-down menu | Select the urgency level of this to do item: High, Medium, or Low. |
| ATTACHMENTS list | Displays a list of attachments associated with this to do item. |
| ADD button | Click to display a File Open dialog box and select an attachment to associate with this to do item. You can attach any type of Windows file. |
| SAVE TO DO button | Click to save this to do item and add it to the appropriate To Do List. |
| CANCEL button | Click to close the screen without saving the to do item. |

FIG. 42

| | |
|---|---|
| DELETE ITEMS button | Click to delete the New Information item(s) that have already been selected by clicking the DELETE checkboxes. |
| DELETE ALL button | Click to delete all the items on the New Information screen, whether they have been selected with the DELETE checkbox or not. |
| SHOW drop-down menu | Select the new information item you want to display. You can select: <br><br> Show all messages <br> What's new - All <br> What's new - To Dos <br> What's new - Appointments <br> What's new - Accounts <br> What's new - Contacts <br> What's new - Deals <br> What's new - Events <br><br> What's changed - All <br> What's Changed - To Dos <br> What's Changed - Appointments <br> What's Changed - Accounts <br> What's Changed - Contacts <br> What's Changed - Deals <br> What's Changed - Events <br> What's Overdue - All |
| RECORDS control | Use to specify which items appear on the current page. This control appears only when there are more records than can be displayed on a single page. |
| MONITOR WEB PAGES button | Click to display the Web Page Monitoring Preferences screen and select the Web pages you want to monitor. |
| DELETE checkbox | Click to mark this item for deletion. Items are not actually deleted from the New Information screen until the DELETE ITEMS button is clicked. |
| NEW INFORMATION Item twist-downs ▷ ▽ | Next to a section heading, click the right-facing ( ▷ ) twist-down to show the items in that selection. The twist-down will point downward when details are displayed. Click the downward-pointing twist-down ( ▽ ) to hide the details. <br><br> Next to an item, click the right-facing ( ▷ ) twist-down to display details about changes to the item. The twist-down will point downward when details are displayed. Click the downward-pointing twist-down ( ▽ ) to hide the details. <br><br> You may also click on the hyperlink associated with the item to go to the detail page for this item. |

FIG. 43

| | |
|---|---|
| NEW WEB PAGE button | Click to display New Web Page To Monitor screen, which enables you to specify a new Web page to track. |
| DELETE ITEM(S) button | Click to delete the Web page(s) that have been selected by clicking the DELETE checkbox. |
| WEB PAGE LIST | Displays the names of Web pages being monitored, the keywords associated with the Web page, the account with which the Web page is associated, and the DELETE checkbox and EDIT icon for each item. |
| DELETE checkbox | Click to mark the WEB PAGE LIST item for deletion. The item is not actually deleted until the DELETE ITEMS button is clicked. |
| EDIT icon | Click to display a screen which enables you to change the URL of the Web page and the keywords associated with it. |

FIG. 44

| ACCOUNT field/ FIND button | Type the full name or the first few letters of the account associated with this record. Click the FIND... button to display a list of matching account names on a drop-down menu. Select the desired account name from the menu. |
|---|---|
| WEB PAGE text field | Type in the URL (Web address) of the page you want to monitor for changes. If you choose to associate an account with a monitored Web page, the system will automatically fill-in the URL (Web address) from the account record. To avoid creating linkage, leave the ACCOUNT field blank. |
| KEYWORDS text field | Fill in the Keywords field to be notified only if the web page changes and it contains at least one of the keywords. If you leave this field blank, you will be notified when any changes are made to the web page. |
| SAVE WEB PAGE button | Click to save this web page information and return to the Web Page Monitoring Preferences screen. |
| CANCEL WEB PAGE button | Click to close the screen without saving any web page information. |

FIG. 45

METHOD AND APPARATUS FOR NETWORK-BASED SALES FORCE MANAGEMENT

RELATED APPLICATIONS

This application is a divisional of U.S. patent application Ser. No. 09/797,053 entitled "Method and Apparatus for Network-Based Sales Force Management," filed Feb. 27, 2001 now U.S. Pat. No. 7,379,064, and naming Keith Raffel, Robert M. Schulman, Dixie Baker, Robert E. Currie, and Christine Currie as inventors, which is a continuation application under 35 U.S.C. §365(c) of PCT Application No. US99/19766 filed Aug. 27, 1999, which designated the United States and claims benefit of U.S. Provisional Patent Application No. 60/098,194 filed Aug. 27, 1998. The above-mentioned application are incorporated by reference herein, in their entirety and for all purposes.

FIELD OF THE INVENTION

The invention relates to the field of managing sales force information. In particular, the invention relates to a method of providing transactional data over a network to sales force members.

BACKGROUND OF THE INVENTION

In order to facilitate accurate decision making, it is desirable to be able to consider a maximum amount of available information in formulating a decision. Maximizing the amount of available information, however, often increases the difficulty of the decision making process, thereby reducing the accuracy of the corresponding decision. This is because the amount of information to be presented, assimilated, and considered in the making of business decisions can be significant in light of the current information age. Therefore, it is desirable to maximize the information presented to a decision maker while presenting the information in such a way as to be readily understood by the decision maker.

One approach to presenting information is to present raw information or statistics to a decision maker. This approach is generally not preferred because a large amount of time is expended by the decision maker in assimilating and understanding the information. Furthermore, the decision maker may not have the training or experience to correctly analyze the information.

Another frequently used approach for presenting information is to organize the material for presentation using graphs and charts compiled from the information. Many different forms of graphs and charts have typically been used, depending on the type of information to be presented. This approach can work well if the information is the type that is easily organized in graph or chart form. Again, however, information presented in graphs and charts can be difficult for the decision maker to assimilate, particularly when information relevant to one event must be compared with information relevant to other events.

Often, when there is a need to compare information from numerous events or transactions, there is a requirement to look at the historical statistics of the transactions. When the historical statistics of the transaction are relevant, concurrent presentation of historical data of the same type and format as the current data is required. It becomes extremely difficult to display historical data concurrently with current data in the same format on the same display using traditional graphs and charts. One reason for this difficulty is the limited space available on typical charts and graphs. In considering the limited space, a characteristic of the current transactional data must be deleted to allow room for each relevant historical characteristic that is displayed. This is especially true in the areas of business transactions, customer information support, and sales where there are large amounts of relevant data for each event, and historical event data are critical to efficient decision making by sales and marketing personnel.

Therefore, it is desirable for everyone in an organization, from the sales and support personnel to the chief executive officer, to be able to take a quick look at significant transaction data and make an efficient evaluation and determination as to the best potential business prospects to pursue or the most serious support problems to fix. Consequently, it is desirable to have an information presentation scheme to increase the efficient presentation of information in the general area of customer information management systems and contact management.

Another problem faced by many organizations in the current information age is that large amounts of information are frequently available regarding business transactions. However, as the members of the organization are mobile, particularly in a sales organization, it becomes problematic to get such large amounts of information into the hands of the individuals that need to act on the information. Furthermore, it becomes difficult to provide for communication among members of the organization, communication that improves the effectiveness of the organization and the personnel. It is equally as difficult to provide for communication among members of the organization and clients of the organization, something upon which survival of the organization may depend. Consequently, it is desirable to have an information provision scheme that is accessible by personnel from a number of locations.

SUMMARY

A method and apparatus for network-based sales force automation are provided herein. Transactional information of deals, contacts, accounts, and leads is provided over an Internet using a Web browser. The information of related transactions is electronically linked, and the transactional information is electronically searchable using custom profiles. The transactional information is accessed and shared among host organization members according to a hierarchy and predefined territories. The transactional information may be automatically imported from and exported to other applications comprising Web sites, spreadsheets, databases, and contact managers. A Radar Screen™ Opportunity Display (RSOD) may be selected on which deal objects are displayed that represent the stages in a sales pipeline of corresponding deals. The deals comprise sales deals, services to be performed, product defects, and calls by representatives. New business information may be selected, wherein automatic notification is provided of new information and changed information relating to transactions, wherein the new business information comprises information on at least one monitored customer Web site. Calendar and to-do information may be selected that is automatically linked with corresponding transactional information. A communication capability is provided that comprises electronic mail, facsimile, telephones, and paging devices, wherein communication is automatically established using transactional information. A record of the communication may be saved in a history file corresponding to the transaction.

These and other features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings, in which like references indicate similar elements and in which:

FIG. 7 shows the access rights to territories of an embodiment of the present invention.

FIG. 10 shows standard fields for Accounts of an embodiment of the present invention.

FIG. 11 shows standard fields for Contacts of an embodiment of the present invention.

FIG. 12 shows standard fields for Deals of an embodiment of the present invention.

FIG. 14 shows the Deal fields to use in triggering notifications of an embodiment of the present invention.

FIG. 15 shows a screen for designating appointments and to-do items used in triggering notifications in an embodiment of the present invention.

FIG. 17 shows the components of an Account List screen of an embodiment of the present invention.

FIG. 18 shows the components of a New Accounts screen of an embodiment of the present invention.

FIG. 19 shows the components of an Electronic Bulletin Board screen of an embodiment of the present invention.

FIG. 20 shows the components of a New Message/New Reply screen of an embodiment of the present invention.

FIG. 21 shows the components of a Search screen of an embodiment of the present invention.

FIG. 23 shows the components of a New Appointment screen of an embodiment of the present invention.

FIG. 24 shows the components of the Contact List screen of an embodiment of the present invention.

FIG. 25 shows the components of a New Contact screen of an embodiment of the present invention.

FIG. 26 shows the components of a Deal List screen of an embodiment of the present invention.

FIG. 27 shows the components of a New Deal screen of an embodiment of the present invention.

FIG. 28 shows the components of a new leads screen of an embodiment of the present invention.

FIG. 29 shows the components of the RSOD screen of an embodiment of the present invention.

FIG. 31 shows a sample table of event characteristics upon which an RSOD implementation is based in an embodiment of the present invention.

FIG. 32 shows example scale and note information that may accompany the RSOD of an embodiment of the present invention.

FIG. 34 shows a sample table of event characteristics upon which an RSOD implementation is based in an embodiment of the present invention.

FIG. 36 shows a sample detail page for an embodiment of the present invention.

FIG. 37 shows a summary of the differences between the three record retrievable methods of an embodiment of the present invention.

FIG. 38 shows the components of a Find screen of an embodiment of the present invention.

FIG. 40 shows the components of a profile screen of an embodiment of the present invention.

FIG. 41 shows the components of a To-Do List screen of an embodiment of the present invention.

FIG. 42 shows the components of a New To-Do screen of an embodiment of the present invention.

FIG. 43 shows the components of a New Information screen of an embodiment of the present invention.

FIG. 44 shows the components of a New Information Web Monitoring Preferences screen of an embodiment of the present invention.

FIG. 45 shows the components of a New Information/New Web Page To Monitor screen of an embodiment of the present invention.

DETAILED DESCRIPTION

A method and an apparatus for network-based sales force automation are provided in a Customer Information Management System (CIMS). The CIMS makes a sales force more effective by managing, reporting on, and analyzing the flow of information throughout a host organization and the entire sales cycle. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention. While the CIMS is designed to support the basic information management needs of the host organization, the CIMS may be customized to meet the needs of specific organizations.

The CIMS of one embodiment provides a broad range of information management and automation functions. The CIMS provides a complete picture of all deals and leads in a sales pipeline, wherein deals are tracked in any form necessary for an organization to move the sales process forward, from an overview to a complete deal history. The CIMS manages account information. A quick profile of each account is provided, including all related contacts and deals, as well as a complete history of all activity associated with each account. The CIMS stores and tracks shared and private contacts. Contacts are easily linked to accounts and deals, and a history of all activities associated with any account is provided. As the CIMS is accessed by a client using the World Wide Web (Web), communication with contacts may be made via electronic mail (e-mail) by clicking on the e-mail address of the contact.

The CIMS provides a Radar Screen™ Opportunity Display (RSOD) that allows for visual tracking of the progress of deals through the sales pipeline. Reports provide a high-level summary and analysis of sales activities. The CIMS informs users when new information has been added to the CIMS environment and when existing information has changed or been updated. Furthermore, the CIMS monitors changes to Web pages that are designated for tracking. A communication function is provided that facilitates the sending of e-mail, facsimiles, quotes, and form letters to individuals and groups of contacts and leads. Moreover, the CIMS provides a calendar function for scheduling meetings and appointments, wherein scheduled activities can be connected to related accounts, deals, and contacts. Action items, or to-do items, can be associated with related accounts, deals, and contacts, thereby facilitating the coordination of deliverables related to deals in the sales pipeline. In addition to the aforementioned functions, the CIMS provides an organization electronic bulletin board and newsgroup.

Figure 1:
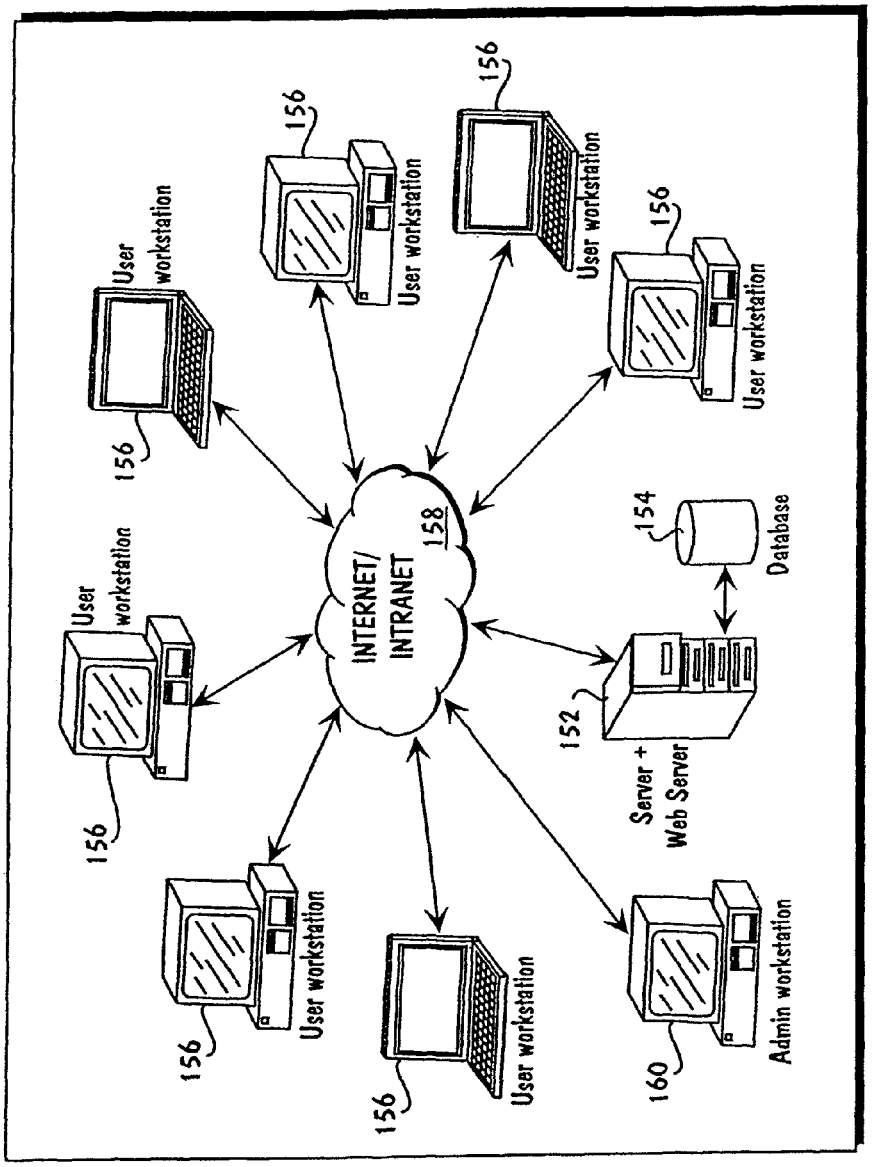
FIG. 1 is a structure of the Customer Information Management System (CIMS) environment of one embodiment of the present invention.

FIG. 1 is a structure of the Customer Information Management System (CIMS) environment 150 of an embodiment of the present invention. The CIMS is hosted on a server 152 that comprises a World Wide Web server, or Web server, or HTTP server. The CIMS server 152 may comprise multiple components, wherein the multiple components may be resident on different servers, but the embodiment is not so limited. The CIMS server 152 is coupled to a database 154. The server 152 controls, routes, and manages sales force information or customer information in the host organization. The server 152 is coupled to numerous user workstations 156 and 160 using an internet or intranet 158, but the embodiment is not so limited. The interactions with the CIMS 152, comprising those of end users 156, or members of the sales force, and administrators 160, are provided using a client Web browser. As such, only the Web browser and a Transmission Control Protocol/Internet Protocol (TCP/IP)-based connection to the network hosting the CIMS are used to connect to the Web server which connects to the CIMS server 152. This allows any authorized user to access the CIMS regardless of the location of the user—in the office, at home, on the road—without the use of special client software. A standard conventional web browser allows any authorized user to access the CIMS. Consequently, communications among CIMS users 156 and 160 are routed through the server 152, which automatically keeps track of which users get access to which information.

Figure 2:
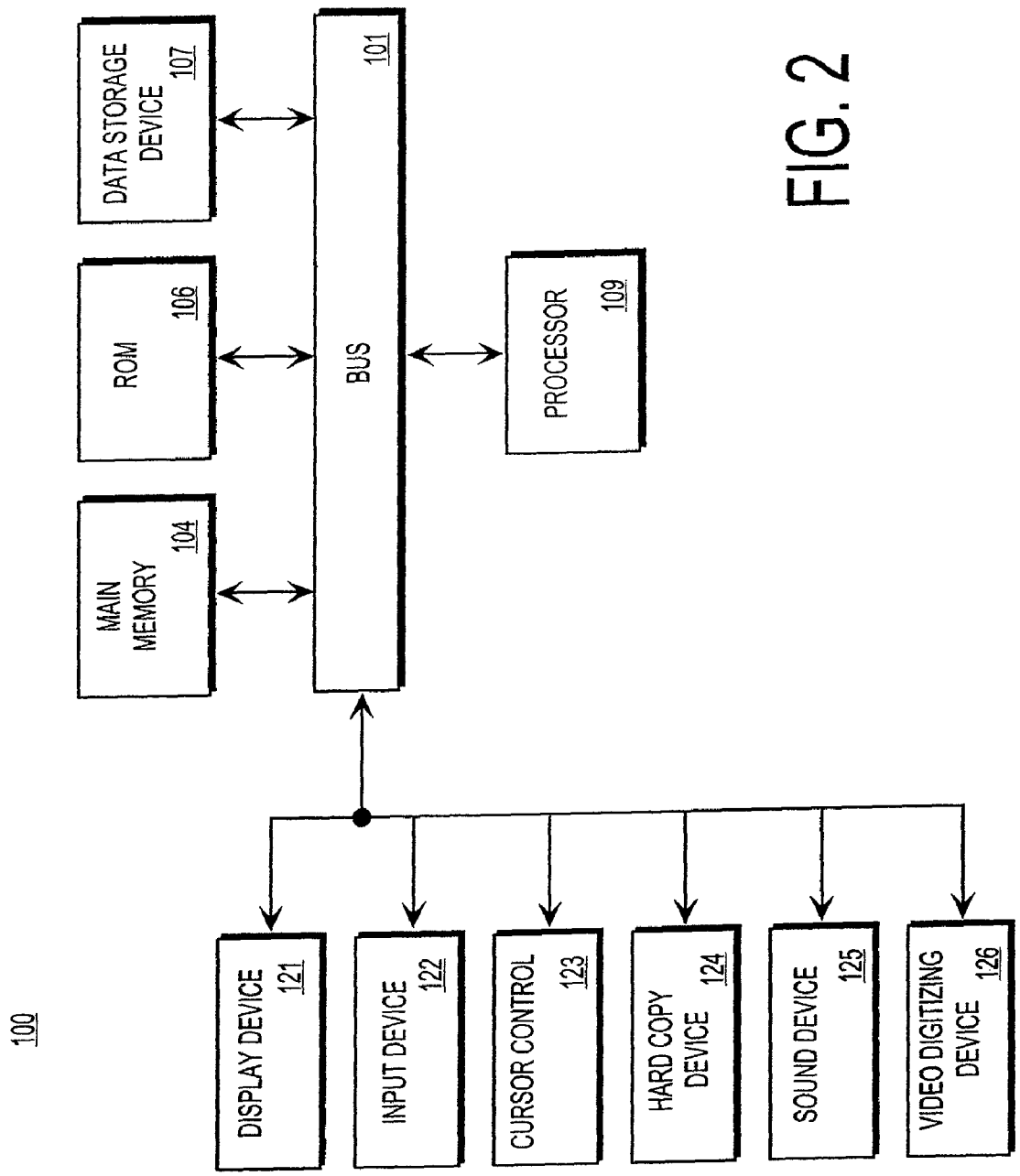
FIG. 2 is a computer system using an embodiment of the present invention.

FIG. 2 is a computer system 100 using an embodiment of the present invention. The computer system 100 may comprise the user workstations, the system administrator workstations, and the CIMS server, but the embodiment is not so limited. The computer system 100 comprises a bus 101, or other communications hardware and software, for communicating information, and a processor 109 coupled to the bus 101 for processing information. The processor 109 represents a central processing unit (CPU) having any type of architecture. The computer system 100 further comprises a random access memory (RAM) or other dynamic storage device in main memory 104 coupled to the bus 101 for storing information and instructions to be executed by the processor 109. The computer system 100 further comprises a read only memory (ROM) 106, or other static storage device, coupled to the bus 101 for storing static information and instructions for the processor 109.

A data storage device 107, such as a magnetic disk or optical disk and a corresponding disk drive, is coupled to the bus 101. The computer system 100 may be coupled via the bus 101 to a display device 121 for displaying information to a user of the computer system 100. Display device 121 can include a frame buffer, specialized graphics rendering devices, a cathode ray tube (CRT), and a flat panel display, but the embodiment is not so limited. An alphanumeric input device 122, including alphanumeric and other keys, may be coupled to the bus 101 for communicating information and command selections to the processor 109. Another type of user input device is a cursor control 123 comprising a mouse, a trackball, a pen, a touch screen, or cursor direction keys for communicating direction information and command selections to the processor 109, and for controlling cursor movement on the display device 121.

In one embodiment, a hard copy device 124 is coupled to the bus 101 and is used for printing instructions, data, and other information on a medium such as paper, film, or similar types of media. Additionally, the computer system 100 can be coupled to a sound device for sound recording and playback 125. The computer system 100 can function as a terminal in a computer network, wherein the computer system 100 is a computer subsystem of a computer network, but the embodiment is not so limited. The computer system 100 may further include a video digitizing device 126. The video digitizing device 126 can be used to capture video images that can be transmitted to other computer systems coupled to the computer network.

Figure 3:
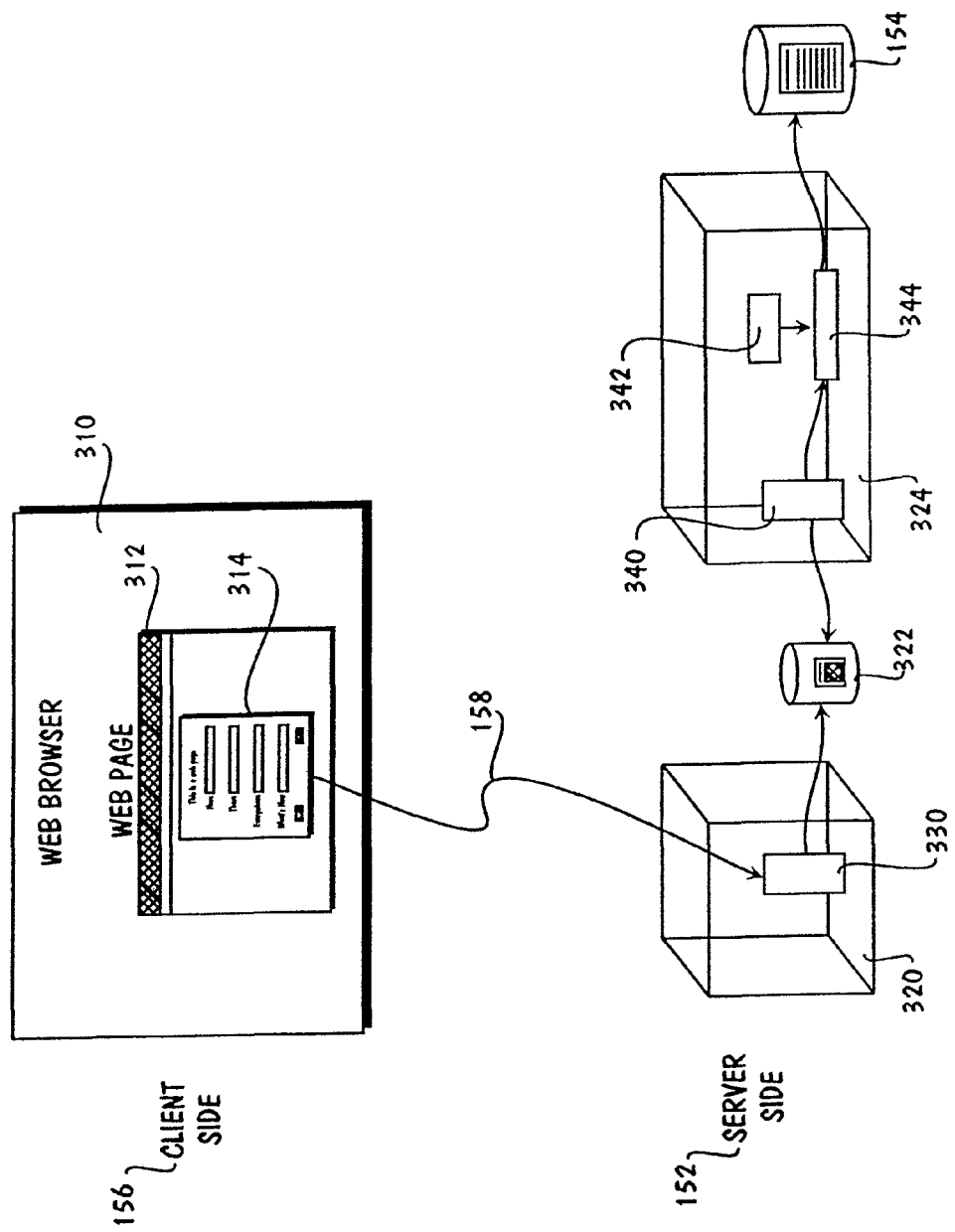
FIG. 3 shows the client side, or user side, and server side components of the CIMS environment of an embodiment of the present invention.

FIG. 3 shows the client side 156, or user side, and server side 152 components of the CIMS environment of an embodiment of the present invention. The client side 156 components comprise a Web browser 310 that accesses a Web page 312. The Web page 312 may comprise embedded forms 314 and data, but the embodiment is not so limited. The client side 156 components are coupled to the server side 152 components using an internet or intranet 158, but the embodiment is not so limited. The server side 152 components comprise, but are not limited to, a Web server 320 coupled to a CIMS server 324 through a data store 322. The CIMS server 324 is coupled to a database 154. The Web server 320 comprises a server-side script 330 that processes information and data from the Web browser 310. The server-side script 330 stores data in the data store 322 for access by the CIMS server 324. The CIMS server 324 of one embodiment comprises an import agent 340, an import template 342, and an import engine 344 that are used to periodically access data from the data store 322, but the embodiment is not so limited.

A method and apparatus for managing at least one transaction are provided herein, wherein the method comprises providing shared information regarding transactions. The transactions of one embodiment comprise at least one deal, at least one contact, and at least one account, but the embodiment is not so limited. The information regarding the deals comprises summary deal information, detailed deal information, a complete history of events associated with the deals, and automatic access to a Web site of customers associated with the deals. The information regarding the contacts comprises a history of activities associated with the contacts, wherein communication with a representative of the contact is automatically established using the information regarding at least one contact. The information regarding the accounts comprises summary account information, detailed account information, a complete history of events associated with the accounts, and automatic access to a Web site of customers associated with the accounts. Furthermore, the transaction may comprise at least one lead, wherein a lead is an emerging business opportunity.

The information of related transactions is electronically linked within the CIMS environment. The information regarding the transactions is provided over a network comprising an Internet and an intranet, but the embodiment is not so limited. The transactional information is provided to a client using a Web browser and Hypertext Markup Language (HTML) and a protocol comprising Transmission Control Protocol/Internet Protocol (TCP/IP), Hypertext Transfer Protocol (HTTP), and Simple Mail Transfer Protocol (SMTP), but the embodiment is not so limited.

Figure 4:
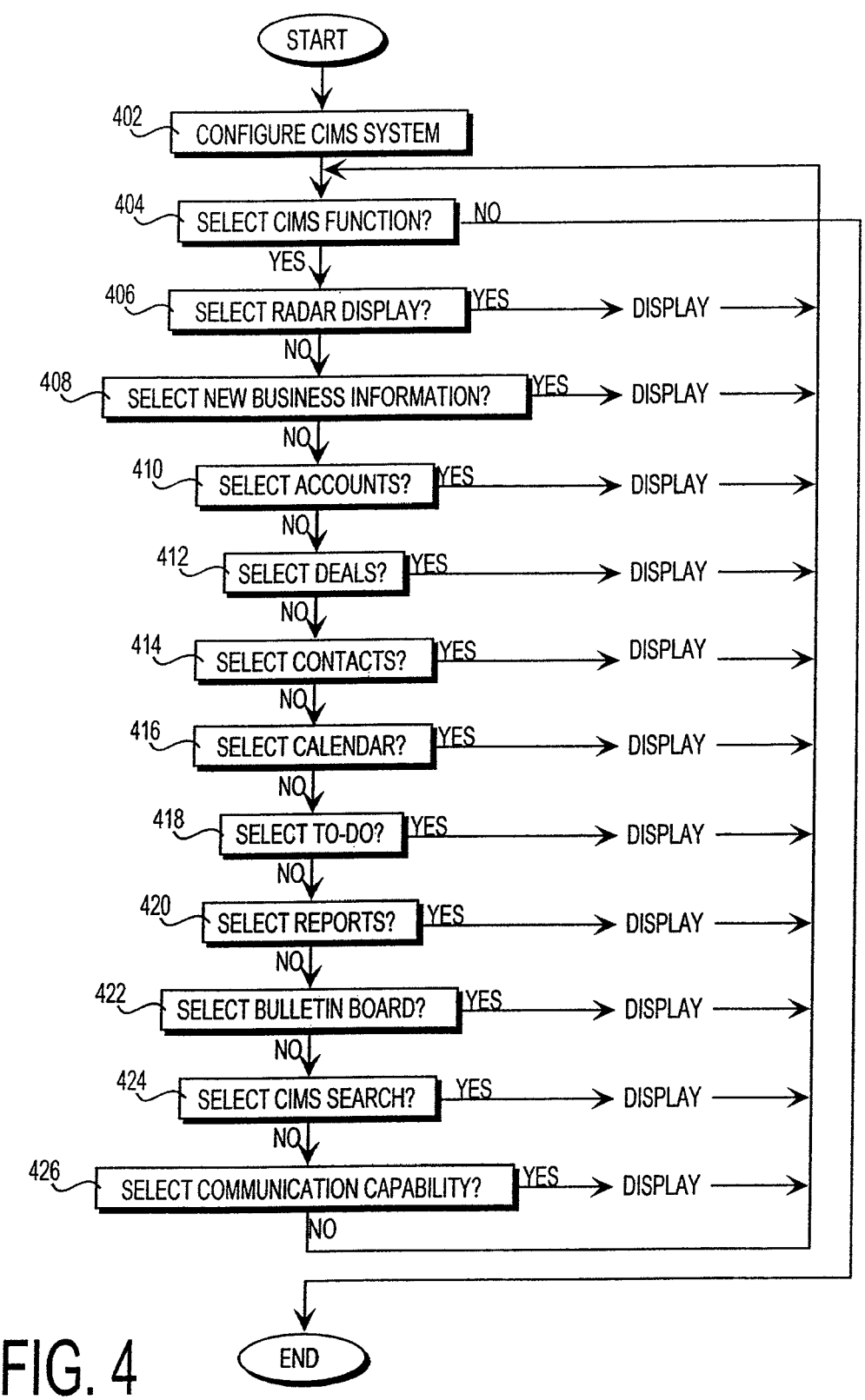
FIG. 4 is a flowchart of a method for managing transactional information of an embodiment of the present invention.

FIG. 4 is a flowchart of a method for managing transactional information of an embodiment of the present invention. Operation begins at step 402, at which the CIMS environment is configured. Configuration of the CIMS comprises several steps. Users are registered to access the shared information regarding at least one transaction using registration information comprising at least one name, a title, at least one electronic mail address, and at least one telephone number. Furthermore, each user is assigned a log-in identification and a password. The CIMS configuration further comprises setting up at least one territory comprising groups of related accounts, contacts, and deals. The territories may be organized according to geographical boundaries, account names, ranges of account names, account sizes, and industry focus, but the embodiment is not so limited. The registered users are assigned to the territories. The assignment comprises assigning the user access to at least one territory as well as assigning one of a number of levels of access rights to each user of each territory. As the information regarding the transaction is shared among sales force members according to a hierarchy and predefined territories, in one embodiment, a territory assignment and the title of the user determines access to the transactional information of the territory, but the embodiment is not so limited.

Configuration of the CIMS environment further comprises inputting transactional information into the CIMS database. Furthermore, the transactional information may be imported from at least one other application comprising Web sites, spreadsheets, databases, and contact managers, but the embodiment is not so limited. The importing comprises importing transactional information interactively through an end-user import system and importing the shared information as a batch operation. The source data comprising at least one field is simultaneously mapped and imported into at least one file, wherein the file comprises information regarding the associated transaction. Moreover, the CIMS may export transactional information to other applications. The importing and exporting may be performed automatically on a periodic basis, but the embodiment is not so limited.

Operation continues at step 404, at which a user may select a CIMS function. If no CIMS function is selected at step 404, operation ends. If a CIMS function is selected at step 404, operation continues at step 406, at which a determination is made whether the RSOD is selected for display. If the RSOD is selected for display, the CIMS provides the RSOD display to the requesting user, and operation continues at step 404. In providing the RSOD display to the user, at least one deal is determined for display. A deal object is generated to display each corresponding deal. The RSOD displays the deal objects a determined distance from a central point on a display. The determined distance of the deal objects represents a related stage of a number of stages of the corresponding deals, wherein the central point of the display represents a final stage of the deal. The deal may comprise a sales deal, a service to be performed, a product defect, and a call by a representative, but the embodiment is not so limited.

If the RSOD is not selected for display, operation continues at step 408, at which a determination is made whether new business information is selected for display. If the new business information is selected for display, the CIMS provides the new business information to the requesting user, and operation continues at step 404. The new business information comprises new information and changed information on at least one monitored Web site or network site. More specifically, the new business information comprises an overview of changed information regarding at least one lead and at least one transaction, new appointments and action items and corresponding electronic links, and information regarding at least one new lead and at least one new transaction and corresponding electronic links. The monitored network site comprises prespecified Web sites and Web pages associated with a corresponding transaction. In monitoring the Web sites, the World Wide Web is automatically polled to search for changes to prespecified Web pages, wherein the automatic polling is conducted once per day at a prespecified time, but the embodiment is not so limited.

If the new business information is not selected for display, operation continues at step 410, at which a determination is made whether account information is selected for display. If the account information is selected for display, the CIMS provides the account information to the requesting user, and operation continues at step 404. If the account information is not selected for display, operation continues at step 412, at which a determination is made whether deal information is selected for display. If the deal information is selected for display, the CIMS provides the deal information to the requesting user, and operation continues at step 404. If the deal information is not selected for display, operation continues at step 414, at which a determination is made whether contact information is selected for display. If the contact information is selected for display, the CIMS provides the contact information to the requesting user, and operation continues at step 404.

If the contact information is not selected for display, operation continues at step 416, at which a determination is made whether calendar information is selected for display. If the calendar information is selected for display, the CIMS provides the calendar information to the requesting user, and operation continues at step 404. The calendar information comprises meetings and appointments, and the calendar information is automatically linked with the corresponding transactions, but the embodiment is not so limited. If the calendar information is not selected for display, operation continues at step 418, at which a determination is made whether to-do information is selected for display. If the to-do information is selected for display, the CIMS provides the to-do information to the requesting user, and operation continues at step 404. The to-do information is automatically linked with the corresponding transactions, but the embodiment is not so limited.

If the to-do information is not selected for display, operation continues at step 420, at which a determination is made whether report information is selected for display. If the report information is selected for display, the CIMS provides the report information to the requesting user, and operation continues at step 404. The report information of one embodiment comprises analytical reports and informative reports about contacts, deals, accounts, and appointments, but the embodiment is not so limited. If the report information is not selected for display, operation continues at step 422, at which a determination is made whether a bulletin board/newsgroup is selected for display. If the bulletin board/newsgroup is selected for display, the CIMS provides the bulletin board/newsgroup to the requesting user, and operation continues at step 404.

If the bulletin board/newsgroup is not selected for display, operation continues at step 424, at which a determination is made whether a CIMS search is selected. If the CIMS search capability is selected, the CIMS provides the associated search display to the requesting user, and operation continues at step 404. The CIMS of one embodiment provides three search devices to be used in electronically searching and locating records of contacts, deals, and accounts that match specified criteria, but the embodiment is not so limited. One search device uses profiles comprising predefined profiles and custom profiles.

If the CIMS search is not selected, operation continues at step 426, at which a determination is made whether a communication capability is selected. If the communication capability is selected, the CIMS provides the communication display to the requesting user, and operation continues at step 404. The communication capabilities of one embodiment comprise electronic mail, facsimile, telephones, and paging devices, but the embodiment is not so limited. Communication is automatically established using the aforementioned devices along with information regarding at least one transaction. A record of the communication may be saved in a history file corresponding to the transaction. If the communication capability is not selected, operation continues at step 404, at which a user may select a CIMS function.

The CIMS is configured and tailored for use in a host organization by a system administrator. As such, the system administrator may customize the CIMS environment to meet the particular needs of the host organization. Specifically, the system administrator defines CIMS database fields and attributes to match the structure of the using organization by incorporating all of the data needed by the sales force. Furthermore, the system administrator may change the display order of data in each field, and may customize the names and numbers of deal stages including adding, deleting, and modifying deal stages to correspond to the way the sales force manages the sales pipeline. Moreover, the system administrator registers CIMS users, creates territories, and assigns user access rights to the territories. The system administrator may generate shared profiles to combine or view information. Additionally, the system administrator may configure import templates to manually or automatically move data from external sources, such as a lead form on the Web site of the host organization, into the CIMS. The system administrator may customize the way users are informed about changes and new information via the New Information screen. The system administrator may administer and maintain the CIMS environment from anywhere the system administrator has access to a network connection, but the embodiment is not so limited.

Figure 5:
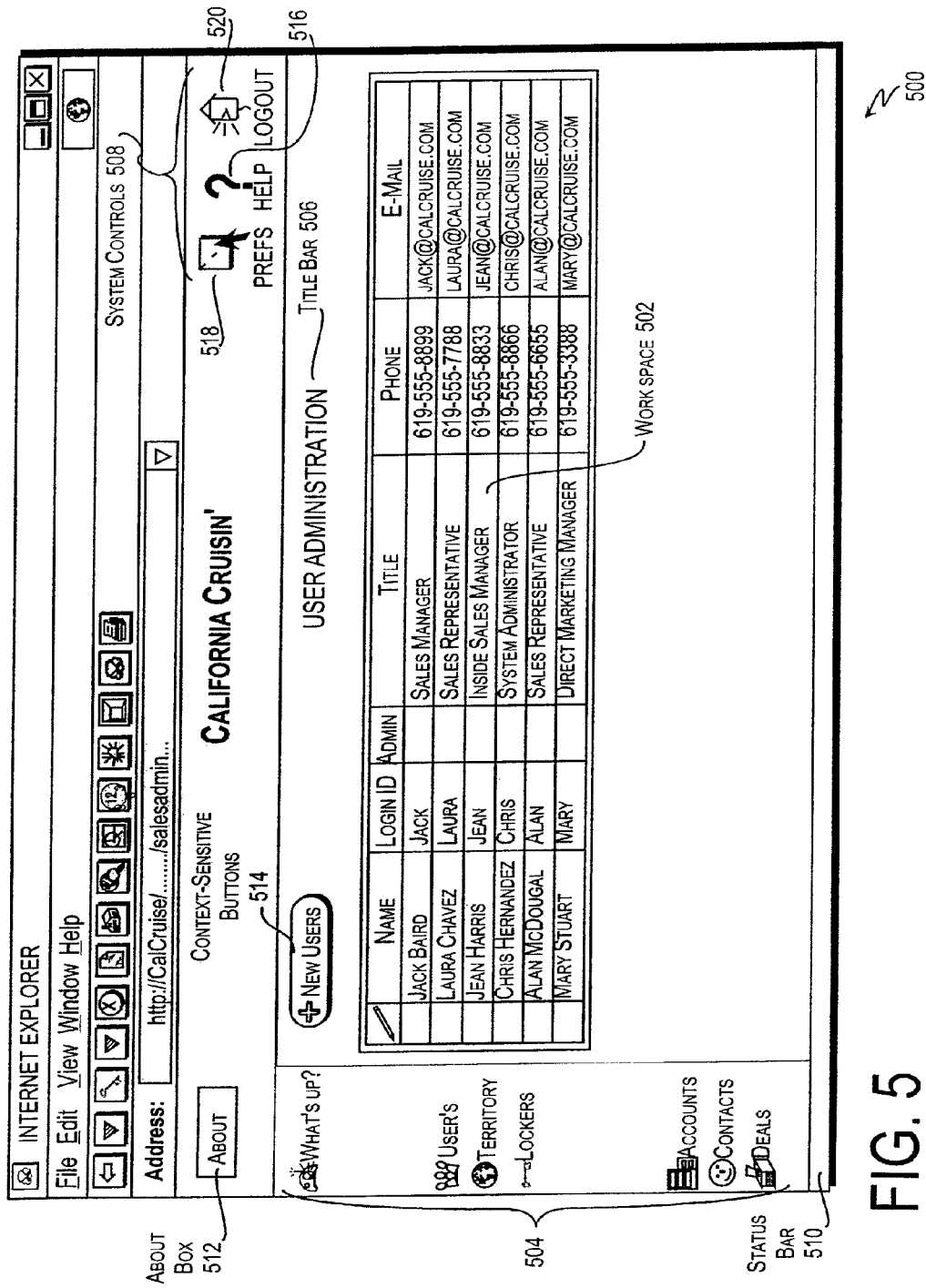
FIG. 5 is an Administrator screen of an embodiment of the present invention.

FIG. 5 is an Administrator screen 500 of an embodiment of the present invention. The Administrator screen 500 comprises a workspace 502, an icon bar 504, a title bar 506, system controls 508, a status bar 510, and an About Box 512, but the embodiment is not so limited. The title bar 506 appears at the top of the workspace 502 of one embodiment, and it contains a title indicating the name of the selected administrator module. Furthermore, the title bar 506 contains context-sensitive buttons 514 that apply to functions of the currently selected module. The workspace 502 is the central display of the screen 500, wherein the contents presented within the workspace 502 depend upon the currently accessed administrator module. In one embodiment, there are seven administrator modules comprising New Information Customization, User Administration, Territory Administration, License Administration, Account Administration, Contact Administration, and Deal Administration, but the embodiment is not so limited. Depending upon the operation that is being performed, a list view may be presented of all of the items or entities in a particular module, such as a list of all users or all territories, or a form view may be presented that shows detailed attributes of a specific item. The icon bar 504 at the left side of the screen 500 of one embodiment allows the administrator to select an administrator module, but the embodiment is not so limited. The modules are selected by clicking the corresponding icon.

A group of system controls 508 are displayed along with the Administrator screens 500 of one embodiment. The system controls 508 comprise a Help control 516, a Preference control 518, and a Logout control 520, but the embodiment is not so limited. Clicking the Help control 516 results in the presentation of context-sensitive help for the currently accessed module. Clicking the Preference control 518 provides a Preference Screen which allows the administrator to customize the CIMS. Clicking the Logout control 520 allows the administrator to terminate the CIMS session. Furthermore, the CIMS session may be terminated by exiting the Web browser or typing in a different Uniform Resource Locator (URL) in the address bar of the Web browser.

The status bar 510 in the lower left of the screen of one embodiment provides status information and helpful tips on the CIMS. The text in the status bar 510 changes as the cursor is moved over controls or hyperlinks. Clicking the About Box 512 of one embodiment provides the administrator on-line access to information about technical support, copyrights, CIMS license agreements, and technology partners, but the embodiment is not so limited.

In order for users to access the CIMS system, they must be registered with the CIMS server, have the hardware and software needed to access the CIMS server using a Web browser, and have an assigned CIMS log-on identification and password. The CIMS system administrator is responsible for providing each authorized user with the aforementioned CIMS access items.

Figure 6:
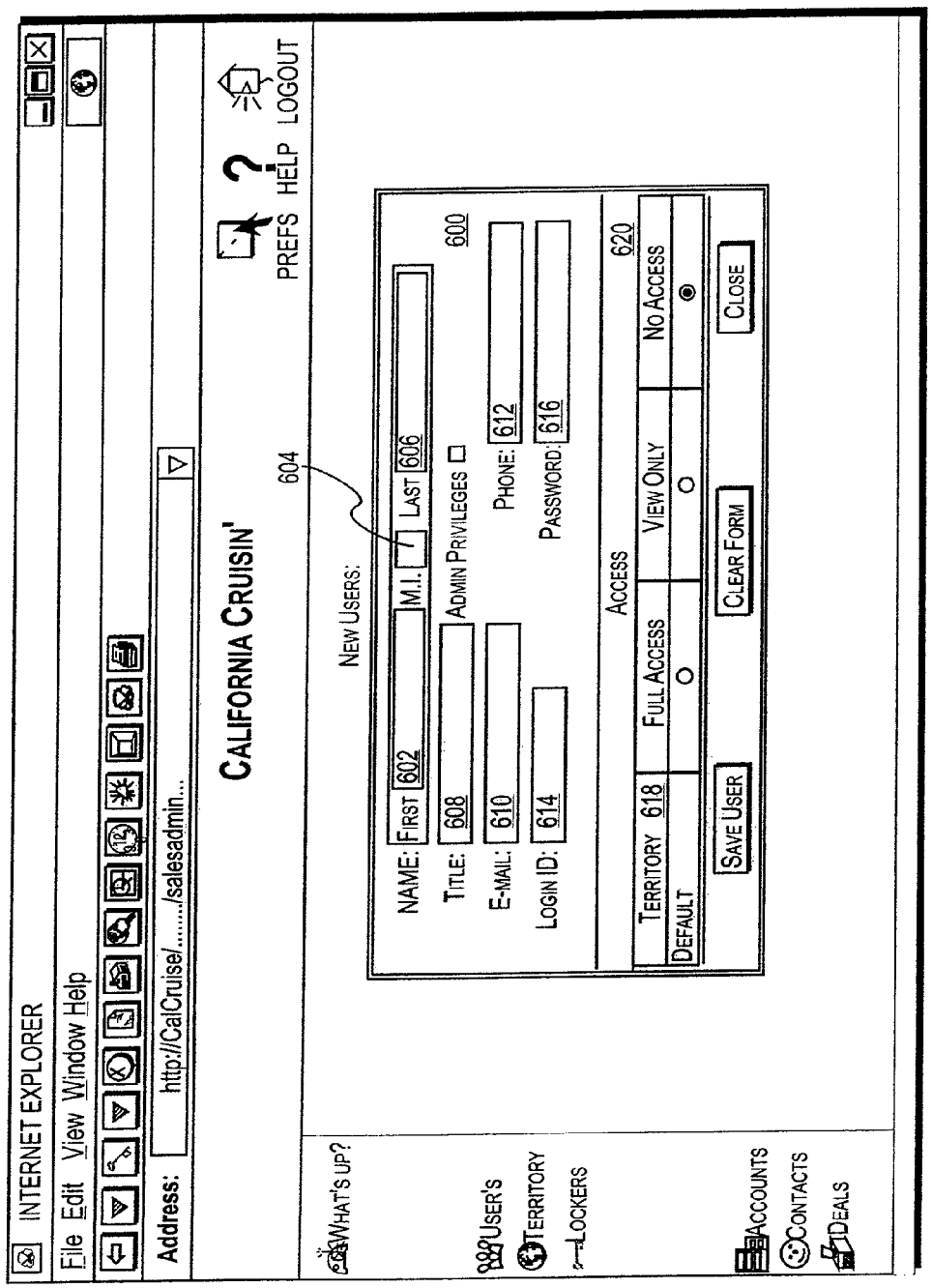
FIG. 6 is a New User form of an embodiment of the present invention.

The system administrator uses a New User form to register authorized users with the CIMS server. FIG. 6 is a New User form 600 of an embodiment of the present invention. The New User form 600 contains information about each authorized user comprising a first 602, middle 604, and last name 606 of the user, a user position title 608, an electronic mail address 610, a telephone number 612, a log-on identification 614, and a password 616. Furthermore, the New User form comprises the territories 618 to which a particular user is assigned and a level 620 of information access that the user has for each territory.

The territorial configuration of the CIMS system provides a way to create groups of related accounts, contacts, and deals and to designate groups of users who have a responsibility to manage and track business taking place within each territory. In one embodiment, system administrators have the ability to establish and maintain territory definitions and to determine access rights of users to the territories, but the embodiment is not so limited. Territories are important in that they limit access to potentially sensitive deal information. By setting up territories so that they reflect the way an organization does business and by assigning appropriate staff members to each territory, only those users who are authorized to do so will be able to view or change confidential information relating to a territory. Furthermore, territories can be used to aggregate accounts and deals for reporting, filtering, and notification. For example, users may create profiles that show accounts, contacts, or deals in specific territories. Moreover, a system administrator may configure the CIMS to notify users every time there is new or changed information for accounts or deals that are located only in their territories. This enables the member of a particular sales team to focus on the information that is most critical to them.

Assigning users to territories in the CIMS system effects the access to deals and the notification of a user. Regarding deal access, only users who are assigned to a territory may create, view, change, report on, and delete deals associated with that territory, but the embodiment is not so limited. All users can view all accounts and contacts no matter which territories they are assigned to, however, they cannot follow hyperlinks from an account or contact to a deal associated with a territory to which they do not have access. On CIMS system screens containing territory pull down menus, the list seen by each user will show only the names of territories with which that user is associated. Regarding notification information, only users who are affiliated with a territory can be notified via the New Information screens about new accounts, contacts, and deals in that territory.

FIG. 7 shows the access rights to territories of an embodiment of the present invention. In one embodiment, the four levels of user access rights to territories comprise Territory Owner 702, Full Access 704, View Access 706, and No Access 708, but the embodiment is not so limited. In one embodiment each territory must be assigned an owner, and only one owner is allowed per territory. The Territory Owner has operational responsibility for deals and accounts assigned to their territory. Furthermore, the Territory Owner may create, view, modify, report on, and delete deals associated with their territory. Moreover, the Territory Owner may create appointments and to-dos associated with deals in their territory.

A user having the Full Access level of rights may create, view, modify, report on, and delete deals associated with their territory. Furthermore, Full Access allows a user to create appointments and to-dos associated with the deals in their territory. A user having the View Access level of rights may view and report on deals associated with their territory. Furthermore, the View Access allows for the creation of appointments and to-dos associated with deals in their territory. The No Access level of rights prevents a user from viewing or reporting deals associated with the territory. Furthermore, a user assigned a No Access level of rights may not create appointments or to-dos associated with deals in the territory.

The system administrator is provided with many different ways to set up territories within the CIMS system. While the territories may be organized around traditional geographical boundaries such as North, South, East, and West, a system administrator may use territories to create many other types of account organizations. In many cases, a non-geographical arrangement may be most appropriate to suit the needs of the CIMS host organization. Territories may be based on account name. This could be useful if the using organization is concentrating on several large customers, each of which has many different divisions that a sales team calls on simultaneously. Territories may be based on ranges of account names; for example one territory comprises account names beginning with the letters A-G, another territory comprises account names beginning with the letters H-P, and another territory comprises account names beginning with the letters O-Z. Furthermore, territories may be based on industry focus, such as banking and financial, entertainment, manufacturing, and travel, but the embodiment is not so limited. Moreover, territories may be based on account size.

Figure 8:
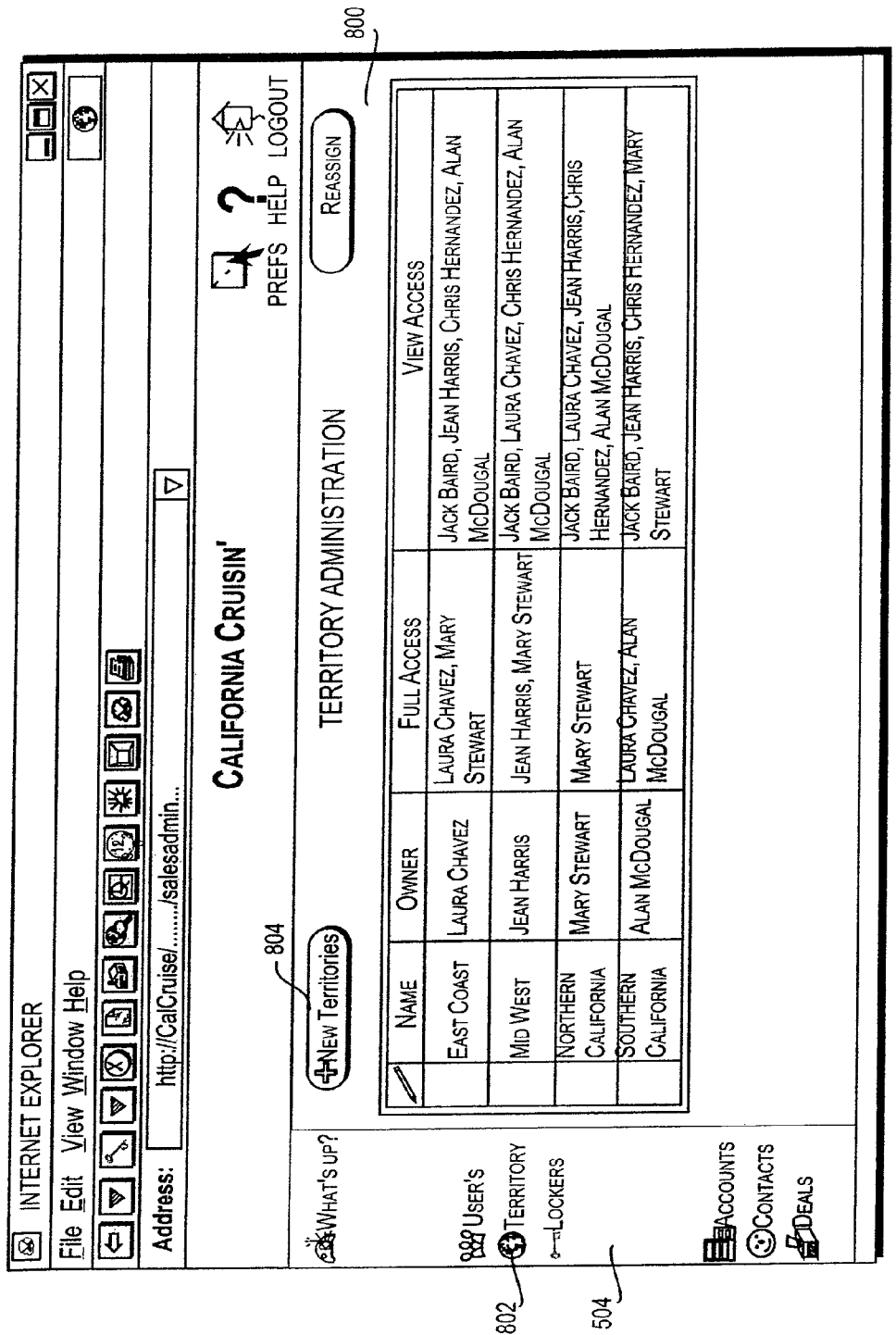
FIG. 8 is a Territory Administration screen of an embodiment of the present invention.

FIG. 8 is a Territory Administration screen 800 of an embodiment of the present invention. This screen 800 is displayed by clicking on the Territory icon 802 in the icon bar 504. The Territory Administration screen 800 lists all existing territories and their members arranged according to access rights. In one embodiment, new territories may be created by clicking on the New Territories button 804 in the upper left of the screen, but the embodiment is not so limited. Clicking on the New Territories button 804 causes a New Territories form to be displayed.

Figure 9:
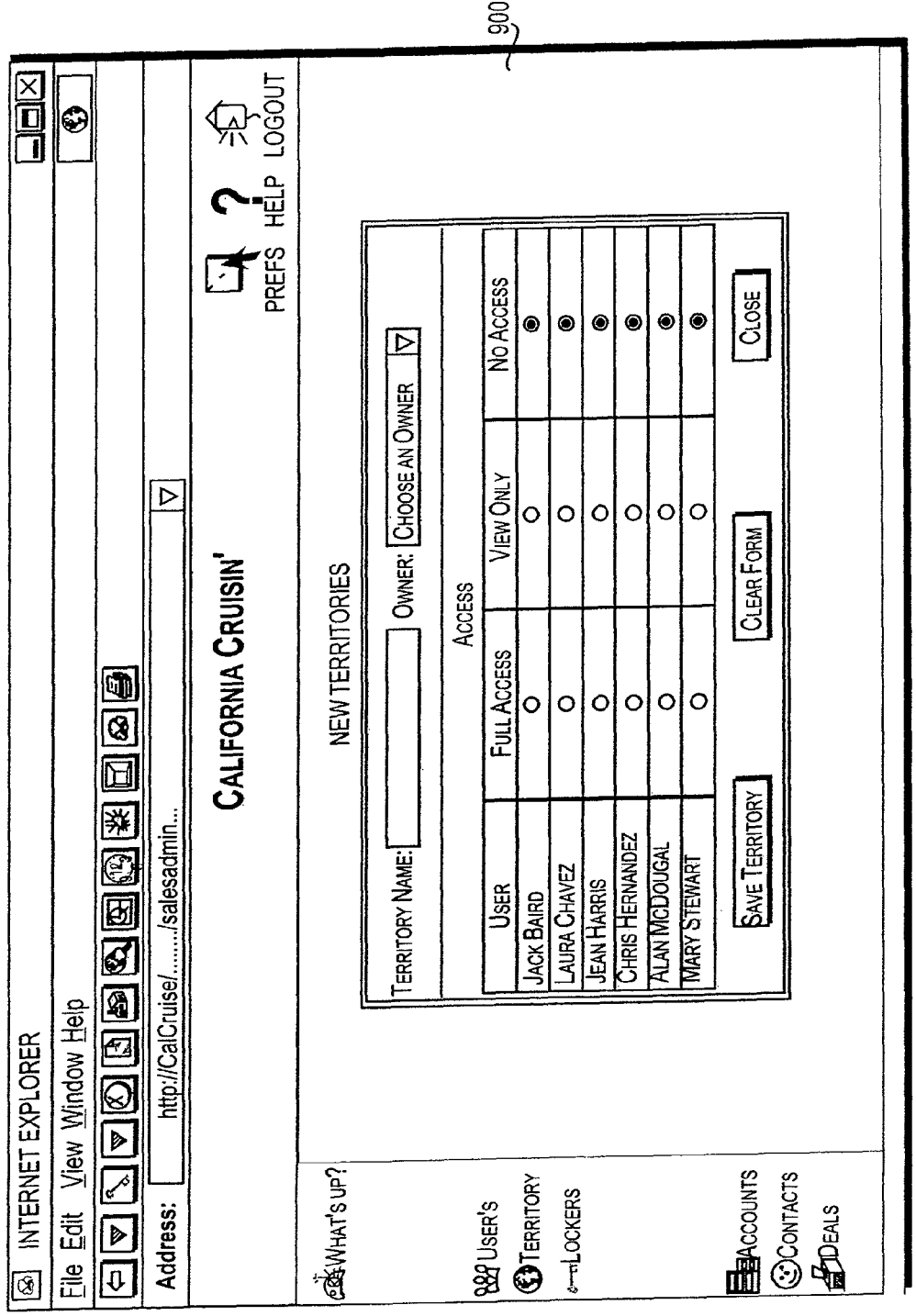
FIG. 9 is a New Territories form of an embodiment of the present invention.

FIG. 9 is a New Territories form 900 of an embodiment of the present invention. Upon display, entries may be made into the New Territories form 900 by the system administrator, thereby defining a territory and the associated individual access authorized to the territory. Furthermore, the CIMS system allows information regarding existing territories to be edited by the system administrator.

A system administrator may tailor the way the CIMS stores and presents account, contact, and deal information to precisely support the way the hosting company does business. FIG. 10 shows standard fields 1000 for Accounts of one embodiment of the present invention. In one embodiment, the Account Name field is required, but the embodiment is not so limited. The Territory field contains a list of values that the CIMS automatically constructs based on the territories currently defined by the system administrator, but the embodiment is not so limited. The Industry field is a list that is precalculated with a list of approximately 65 major industry types; the system administrator should review this list and modify the list as necessary to ensure that it includes industry categories suitable for the CIMS host organization.

FIG. 11 shows standard fields 1100 for Contacts of one embodiment of the present invention. Contact name is the only required field, but the embodiment is not so limited. The Account and Territory fields contain lists of values that are automatically constructed by the CIMS based on the accounts and territories currently stored in the database, but the embodiment is not so limited.

FIG. 12 shows standard fields 1200 for Deals of an embodiment of the present invention. In one embodiment, all of these fields are required except the Qualifications field, which may be used to store miscellaneous information about a deal, such as budgets, and expressions of product interest, but the embodiment is not so limited. The Account and Territory fields contain lists of values that are automatically constructed by the CIMS based on the current active accounts and territories stored in the database, but the embodiment is not so limited. The Source and Rating fields are prepopulated with values that are appropriate across a wide range of businesses, but the embodiment is not so limited, and the system administrator should review these and modify them as necessary to make sure they are appropriate for the CIMS host organization.

Administrator Accounts, Contacts, and Deals screens may be used to make multiple types of changes to the corresponding CIMS tables, but the embodiment is not so limited. These changes comprise the following, but are not so limited: adding new fields and determining the data type of the added fields; renaming and changing other attributes of existing fields; inactivating existing fields other than system required fields; making existing fields or added fields into required fields; modifying built-in lists of values provided with certain fields of the standard tables, and specifying lists of values for defined fields; and, changing the order in which fields in Accounts, Contacts, and Deals are displayed in both list view and form view.

Account, contact, and deal information and data may be imported into the CIMS of one embodiment of the present invention. Using the CIMS import capabilities, information and data may be imported that is already maintained in a corporate directory, address book, or contact manager into the CIMS. Importing provides an easy way to initialize the CIMS database with data that have already been collected. Data may be imported into the CIMS in two ways, interactively through the CIMS end user import system, or automatically as a batch operation that is set up by the system administrator.

Interactive imports provide a simple way to move data from an external source into the CIMS database and may be initiated at any time by a system administrator or a user. Automated import operations involve additional steps that require coordination with outside processes and resources, but the embodiment is not so limited. Both types of import operations involve the same basic sequence of setting up an import template and then applying the template parameters to the import data records. The import template is set up within the CIMS to allow the CIMS to map the data contained in the source file into the CIMS database. The CIMS then applies the template parameters to each record in the source file, wherein all source records that can be successfully translated into CIMS records are written to the CIMS database as specified by the associated template.

Several steps are followed in interactively importing data into the CIMS. An existing template is selected for use or modified, or a new template is created. The name of the source file is then specified that contains the data to be imported into the CIMS. The fields read from the specified source file are then mapped to the corresponding fields in the CIMS database. It should be noted that the data from a single source file may be simultaneously imported to one, two, or all three CIMS tables, wherein the CIMS tables comprise Accounts, Contacts, and Deals. The user then fine tunes the way that the source data is imported into the CIMS database. The fine tuning comprises, but is not limited to, the following actions: specifying whether or not duplicate records contained in the source file will be posted to the CIMS database tables; specifying whether imported records should trigger new information notifications; allowing the user to capture all of the data contained in the source file when there is not an appropriate target field in the CIMS in which to store the data; assigning imported accounts, contacts, or deals to a selected territory when a source field has not explicitly mapped to a territory field; and, selecting a deal source when importing information into the CIMS deal table and not explicitly mapping a source field to the deal source field.

In addition to the CIMS interactive import capability, the CIMS may be configured to import data from an external source automatically on a periodic basis. This feature may be used, for example, to automatically import data gathered via a Web page into the CIMS environment. Furthermore, it could be used to automate the import of data purchased from third party sources, such as market research vendors or credit bureaus. With reference to FIG. 3, a discussion of an automated import process follows.

The process for an automated import operation comprises designating a data source into which raw data can be input. A script 330 or other process is constructed to format and process the raw data in preparation for importing into the CIMS server 324. The raw data is written to one or more files and copied to a predetermined location on the CIMS server 324. An agent polls the CIMS server 324 at a regular interval and passes the data to the CIMS import engine 340. The import engine 340 processes the source file and writes out data to the CIMS database 154 according to the mapping and other specifications encoded in the designated automatic import template 342. The source file is copied to an archive directory and a log file is written that contains a detailed record of the results of the import operation. While this process for an automated import operation has been described with reference to specific steps, the embodiment is not so limited.

The data source that is used to feed the automated import operation is typically a form 314 embedded on a Web page 312, however, it could be a data feed purchased from a third party source, or a set of files periodically generated by a data warehouse, but the embodiment is not so limited. In order to create an automated data gathering environment, the raw data gathered must be validated, filtered, and possibly transformed or restructured before it is provided to the CIMS environment for processing. The basic operations that should be performed before taking the data to be imported comprise data type checking, validity checking, and checking to make sure that values are entered for all required fields, but the embodiment is not so limited.

The processing script 330 may perform several functions, but the embodiment is not so limited. The processing script 330 may write individual records gathered from the data source into a file formatted to be imported into the CIMS environment. Furthermore, the processing script 330 may add default values for required fields that are needed to generate CIMS records but that may be missing from the source data. Moreover, the processing script 330 may move the source file into the import data store 322. The functions performed by the processing script 330 may be handled in a variety of ways, but the embodiment is not so limited. All processing script functions may be performed on the client side 156 by a script attached to the Web page 312 containing the data entry form, or the functions may be performed by the form itself. Furthermore, the processing script functions may be performed by a server-side 152 script or other process. Moreover, the processing script functions may be distributed among several processes that reside both on the client side 156 and on the server side 152.

The processing script 330 periodically writes source data to the import data store 322, which is a predetermined location to store files containing data related to automatic import operations. In one embodiment, each location designated to store import source files is an import folder that is hardwired to be in the same location as the CIMS files on the server 324, but the embodiment is not so limited. The data store 322 comprises two sub-folders created under the import folder that are used to store data created during automatic import operations. A first sub-folder comprises an archive that contains copies of source files that have been processed by the CIMS import engine 344. These are maintained so that the results of each import can be audited against the original sources. A second sub-folder contains a log file for each source file that has been processed. Using the copies of the source files and the log files contained in the two sub-folders, the import process may be audited to insure that the expected results are being produced.

The CIMS import agent 340 periodically polls the data store 322 and presents any source files found at the time of polling to the import engine 344 for processing. The frequency with which the import agent 340 polls the data store 322 may be set by the system administrator, but the embodiment is not so limited. Furthermore, the system administrator specifies the import template 342 to be used by the import engine 344 during automatic import processing, but the embodiment is not so limited.

Prior to deployment of the CIMS, the system administrator should initialize and configure the CIMS environment to that of the host organization. While many functions of the CIMS may be customized, the New Business notifications are of particular importance. The New Business notifications are designed to help maximize the effectiveness of the host organization sales force by highlighting important changes and additions to the information stored in the CIMS. By monitoring the changes posted in New Information, users can see at a glance any new appointments and meetings that they have been scheduled for and any to-do items that have been assigned to them. Furthermore, the user may be notified regarding changes or additions to Accounts, Contacts, and Deals in territories with which they are associated and about changes to Web pages that the user has designated the CIMS to monitor. The CIMS allows the system administrator to customize the following, but the embodiment is not so limited: customize the way the CIMS notifies users about changes to Accounts, Contacts and Deals; customize the way the CIMS notifies users about new appointments, meetings, and to-do items; and, specify the time at which the CIMS will search the Web for changes to monitored Web pages.

Figure 13:
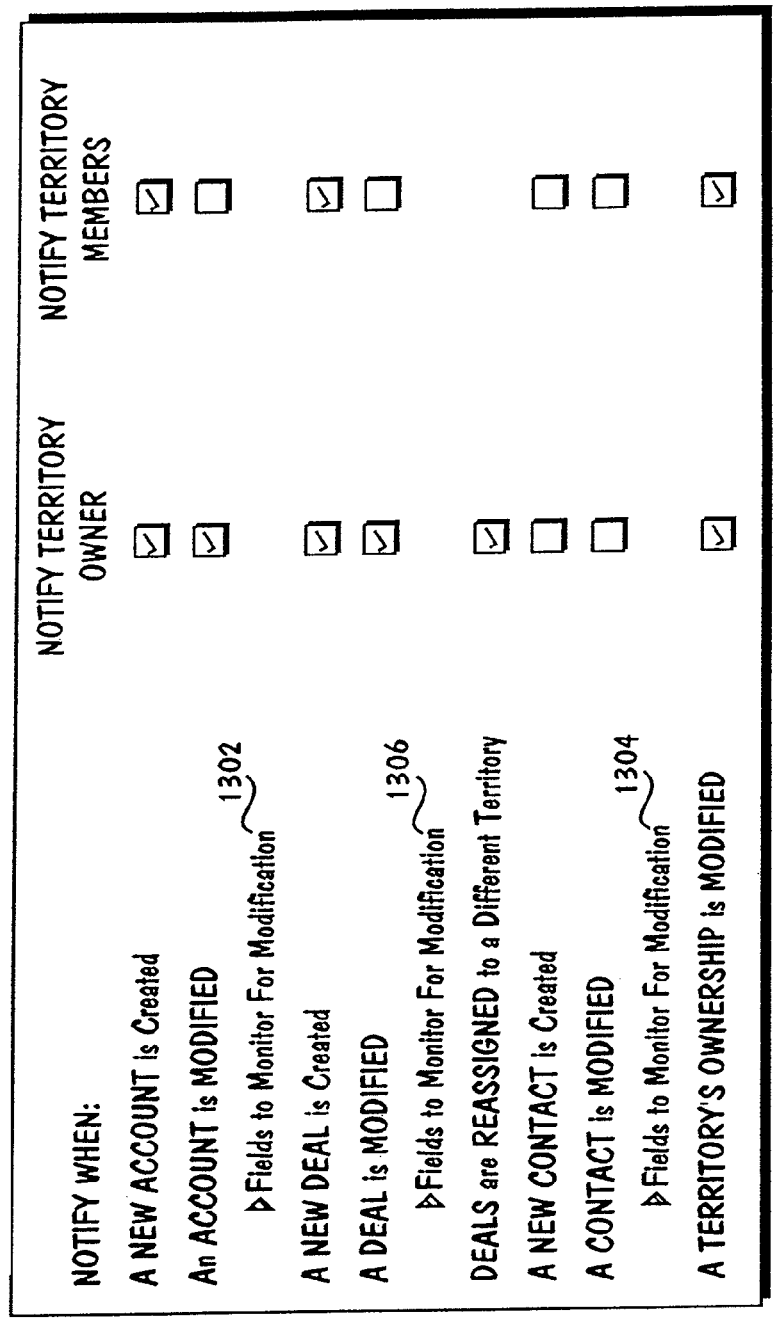
FIG. 13 shows a screen for customizing notifications about changes to Accounts, Contacts, and Deals of an embodiment of the present invention.

FIG. 13 shows a screen 1300 for customizing notifications about changes to Accounts, Contacts, and Deals of an embodiment of the present invention. This screen 1300 allows the system administrator to specify exactly which changes will trigger the CIMS to notify users regarding changes to Accounts, Contacts, and Deals. In one embodiment, notifications about new or changed Accounts, Contacts, and Deals data are only provided to users who have access to the territories which the new or changed data effects, but the embodiment is not so limited. Using this screen the system administrator could, for example, notify both Territory Owners and members, or users who have either Full or View access to a territory, whenever a new account or deal is created, but only notify owners when deals or accounts are changed.

The system administrator can further customize when notifications about changes are generated by using a twist-down for Account 1302, Contact 1304, and Deal 1306 fields. FIG. 14 shows the Deal fields 1402 to use in triggering notifications of one embodiment of the present invention. FIG. 14 shows the screen from FIG. 13 after the Deal fields have been twisted-down. The settings 1404-1410 specify that territory owners will be notified about changes to deals only when the Stage 1404, Status 1406, Probability 1408, or Projected Closing Date 1410 of a corresponding deal are changed.

FIG. 15 shows a screen for designating appointments and to-do items used in triggering notifications in an embodiment of the present invention. The system administrator specifies that both the creation and cancellation or modification of a calendar or to-do item should trigger notifications. Furthermore, the system administrator may cause the CIMS to notify the originator of an appointment or a to-do item that a recipient has declined to attend a meeting or that an assigned to-do item has become overdue.

The CIMS server of one embodiment may be configured to automatically poll the Web to search for changes to Web pages that individual users would like to monitor. If any Web pages have been designated for monitoring, the CIMS server will automatically poll those pages once per day, but the embodiment is not so limited. If any changes to the Web pages that a user is monitoring are detected, the user is notified via the New Information screen. By default the CIMS server of one embodiment is set to conduct the polling at 12:00 A.M. However, the polling time may be changed. In order to maximize server performance and throughput, and to minimize contention for server resources, it is preferable to set the poll time to a period when the CIMS server activity should be at a minimum, but the embodiment is not so limited.

Upon completion of the registration of users and customization of the CIMS environment, members of the host organization may begin using the CIMS. In one embodiment, there are several client requirements comprising minimum hardware, software, and network requirements that the user may meet in order to access the CIMS, but the embodiment is not so limited. A Transmission Control Protocol/Internet Protocol (TCP/IP) connection to the host organization CIMS environment is used in one embodiment, but the embodiment is not so limited. The TCP/IP connection may either be a direct connection via a Local Area Network (LAN) or a dial-up connection that will enable a user workstation to receive Web pages from the Web server installed on the CIMS server, but the embodiment is not so limited. The user may have a personal computer capable of running the Web browser, but the embodiment is not so limited. For example, Netscape Navigator or Communicator version 4.03 may be used as well as Microsoft Internet Explorer version 4.0 or higher versions, but the embodiment is not so limited. The CIMS of one embodiment is certified to run and use Web browsers in either a Microsoft Windows environment or a Microsoft Windows NT 4.0 workstation or server environment, but the embodiment is not so limited. The user should also have a URL to access the CIMS. Furthermore, the user should have an assigned log-on identification and a password.

Figure 16:
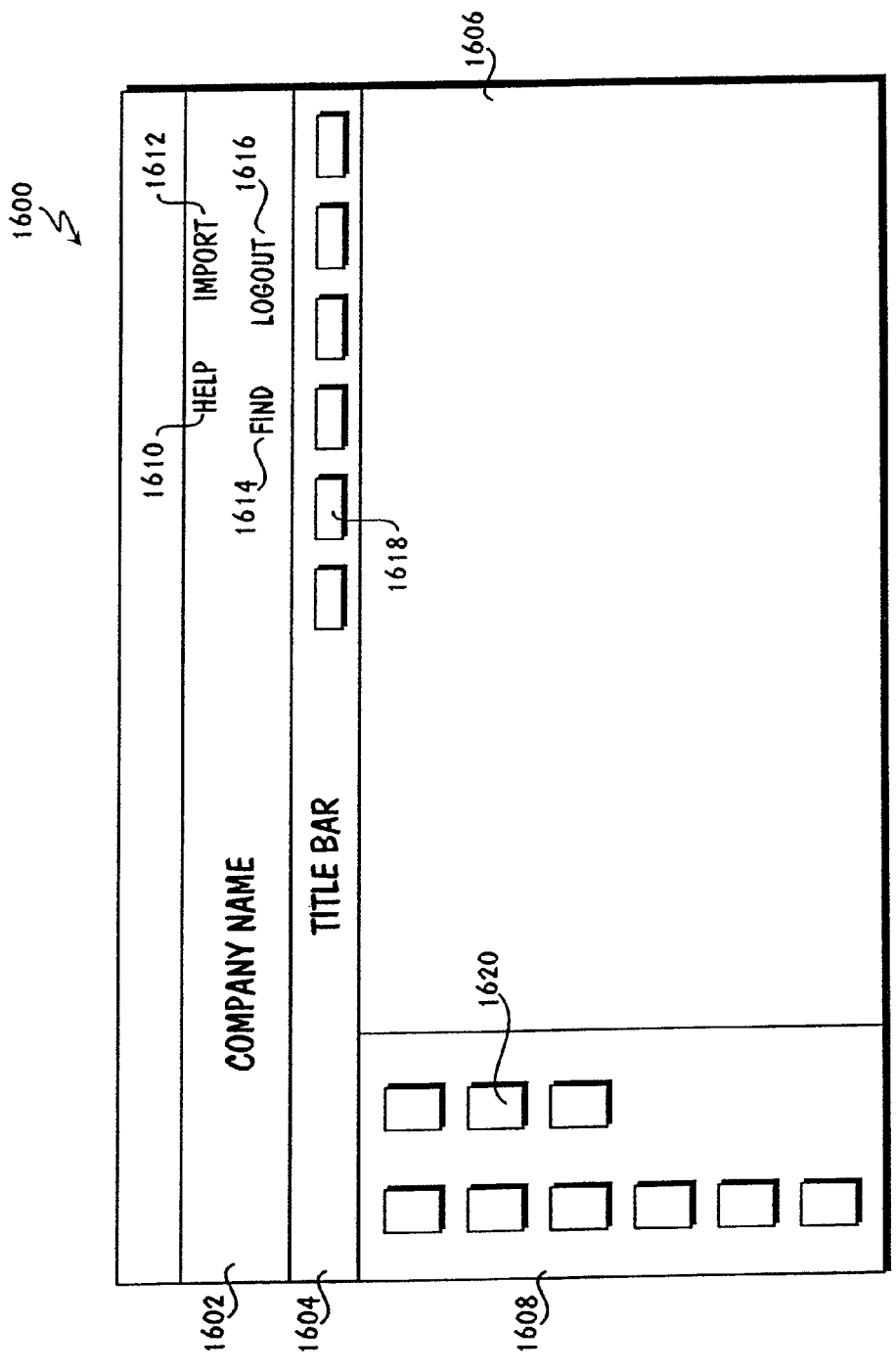
FIG. 16 shows a main CIMS screen of an embodiment of the present invention.

An authorized user accesses the CIMS using a Web browser running on their client computer. The client computer comprises a personal computer, but the embodiment is not so limited. Upon authorized access to the Web server of the host organization, a main CIMS screen will be presented to the user. FIG. 16 shows a main CIMS screen 1600 of an embodiment of the present invention. The main screen 1600 of one embodiment comprises a header 1602, a title bar 1604, a workspace 1606, and an icon bar 1608, but the embodiment is not so limited. The header 1602 displays the name of the host organization, but the embodiment is not so limited. In one embodiment, the header 1602 comprises system controls comprising Help 1610, Import 1612, Find 1614, and Logout 1616 that are available on every screen, but the embodiment is not so limited. The title bar 1604 comprises the name of the current CIMS screen 1600. Furthermore, the title bar 1604 comprises buttons 1618 or function icons that change depending upon the function of the current screen, but the embodiment is not so limited. The icon bar 1608 of one embodiment allows a user to select a particular CIMS module for use. The CIMS of one embodiment comprises nine modules, each of which is represented by a module icon 1620 in the icon bar 1608, but the embodiment is not so limited. Clicking on a module icon 1620 results in selection of the corresponding CIMS module. The workspace 1606 comprises the presentation of CIMS information from a selected module in both lists and forms, but the embodiment is not so limited.

Navigating around the CIMS user environment of one embodiment is very much like navigating around a Web site, but the embodiment is not so limited. To select or move to a particular CIMS module from the main CIMS screen, click the corresponding icon in the icon bar. Hyperlinks are used to instantly access information related to a particular item that the user is viewing, but the embodiment is not so limited. The hyperlinks of one embodiment are indicated by underlines, but the embodiment is not so limited. The main CIMS List screen contains summary information about Accounts, Contacts, and Deals, but the embodiment is not so limited. Complete details are available for any item by clicking on the associated hyperlink in the list. For many detail screens, clicking on a Close button allows a user to return to the list. A summary of details is available for any item by clicking a twist-down button located next to or associated with the corresponding item. Most items in the CIMS system may be edited or deleted by clicking on an Edit icon that appears along with or associated with individual entries, but the embodiment is not so limited. Clicking on the Logout button allows a user to exit the CIMS environment.

The CIMS system provides a user with the ability to enter and look at their own information, information for Accounts, Contacts, and Deals with which they are associated, as well as information of other members of the host organization. New information is entered into the CIMS by clicking on a New button on the right side of the title bar. Clicking on the left half of the New button of one embodiment brings up a New Entry form for the screen that the user is currently viewing. For example, if a user is viewing the Account list, clicking on the left side of the New button will bring up a New Account form. Clicking on the right half of the New button brings up a menu that allows a user to select the type of new entry that the user wants to add from any screen. Many New buttons are context sensitive. Clicking on, or selecting, this context-sensitive New button allows a user to enter a new item that is automatically linked to the item that the user is currently viewing. For example, if a user is viewing details about an Account, clicking the context-sensitive New button allows the user to create a new Deal record that is linked to the account.

The CIMS system allows a user to sort list information by the values in a column by clicking on the column heading of the column of interest. For example, if a user wants to sort Accounts by industry, the user will click on the Industry column heading. In one embodiment, there are three ways to quickly locate information in the CIMS environment. As a first method, a user may click a Find button to quickly locate all records in Contacts, Deals, or Accounts that contain a certain word or string of characters. The Find function searches the account name field, contact first and last name fields, and deal description field. A user can select a capability associated with the Find function to look in one or more of the Accounts, Contacts, and Deals tables.

As a second method, a user may click a Search button to locate records or entries that match specific criteria as specified by the user. Unlike the Find function, Search applies only to the type of information that a user is currently looking at, but the embodiment is not so limited. For example, if a user clicks Search from a Deal screen, the user will only search through Deals. Furthermore, Search allows a user to be more specific than Find in that a user can tell Search to look for values only in the particular fields in which the user is interested. The result of a Search in Accounts, Contacts, or Deals is a subset of the table that shows only the records that match the users search specification.

A third search method, Profiles, allows a user to be even more specific than either Find or Search. For example, a user may create a profile that shows all deals in the negotiation stage in the Western territory. Unlike Find and Search, Profiles can be saved and used repeatedly. To use an existing profile, a user clicks on a pull-down menu in the title bar. This menu displays a list of currently defined profiles available to the user. Clicking the Profile button on the Accounts, Contacts, or Deals list screens allows for the creation of a new profile or the editing of an existing profile. Created profiles may either be private to the creating user or shared with other CIMS users.

As previously discussed, the CIMS system of one embodiment uses nine major modules, but the embodiment is not so limited. The nine modules of one embodiment comprise, but are not limited to, the following: a New Information module; a To-Do module; a Calendar module; an Account module; a Contact module; a Deal module; a Radar Screen™ module; a Reports module; and, a Bulletin Board/Newsgroup module. The New Information module provides an instant overview of everything new and changed in the CIMS environment of which the user should be aware. As such, links to new appointments and to-do items that have been assigned to the user may be seen. Furthermore, links to new accounts, leads, and deals in the territory to which the user is assigned may be seen. A user may be alerted when there is new information on a Web site corresponding to an account to which the user is associated. The To-Do module allows for the entry and tracking of action items for a user and others in the host organization. Moreover, the co-workers of a user may enter to-do items for the user. To-do items may be associated with Accounts, Deals, and Contacts, thereby allowing a user to instantly see all open action items for each entry, but the embodiment is not so limited. The Calendar module allows for the scheduling of meetings and appointments. The Calendar may be used to view the schedule of the user and the schedule of co-workers. Calendar events may be connected with Accounts, Contacts, and Deals, thereby making it easy to get an overview of all scheduled activity for each item.

The Accounts module allows for the management of account information. A user can get summary account information or a detailed view. Furthermore, a user may see a complete history of all events associated with a particular customer. The Accounts module allows a user to see a Web site associated with an account by clicking on the URL listed in the account entry.

The Contacts module allows for easy tracking and communication with important individuals. A user may enter private contacts information for exclusive viewing and use by the user. Furthermore a user may share contact information with others in the hosting organization. The CIMS system allows a contact to be automatically dialed by clicking on the listed contact phone number.

The Deals module provides comprehensive information regarding all deals in the sales pipeline. The Deals module provides information at many levels of detail, from a quick overview to a complete history of every contact, appointment, and event associated with the deal. Furthermore, Deals screens may be used to track leads that have been entered into the CIMS.

The Radar Screen module provides the user with a graphic overview of active deals and the location of the deals in the deal pipeline using a Radar Screen™ Opportunity Display (RSOD). The RSOD allows a user to see at a glance, how deals are progressing through the sales cycle. The Reports module allows a user to analyze and summarize information stored in the CIMS. The Bulletin Board/Newsgroup module provides an electronic bulletin board for the posting of the latest news and developments within the host organization. The Bulletin Board/Newsgroup module may be used to distribute company announcements, maintain company policies, distribute forms, as well as allowing for communication between individuals of the host organization, but the embodiment is not so limited.

An account in the CIMS is an organization, such as a company or department in a company, with which a user is doing or hopes to do business. Depending on how the system administrator sets up the CIMS, a user may track various account information comprising address, number of employees, and annual revenue. Each account may have associated contacts, or individuals within the organization with whom a user is working. Furthermore, an account has associated deals or business opportunities. The deal is the primary organizing unit in the CIMS. Where accounts and contacts are used to track relatively static information about an organization and its people, a deal tracks the dynamics of a business opportunity as it moves through the sales process. Moreover, an account may have associated to-do items, appointments, and history. An account may represent several things in a selling model of the host organization. Examples of some things an account might represent include, but are not limited to: a physical site; a buying organization; and, a corporate organization. Accounts are managed through the Account List, which enables a user to display a list of accounts, edit existing accounts, and add new accounts to the list.

FIG. 17 shows the components of an Account List screen of an embodiment of the present invention. The Account List screen components comprise, but are not limited to, the following: a New button; Show drop-down menu; Records control; Search button; Communicate button; Profile button; Account List; Account List item twist-down; Account List sort arrows; and, an Edit icon. The New button is used to create a new lead, account, to-do item, contact, appointment, or deal, using the New Leads screen, New Accounts screen, New To-Do screen, New Contact screen, New Appointment screen, or New Deals screen. Clicking on the "plus" sign allows for the creation of a new account. Moving a cursor anywhere over the button brings up a list of all record types that may be created, wherein the desired option may be selected by the user. The Show drop down menu component allows the user to select a profile for use in determining which accounts are displayed in the account list. A user may select active accounts, inactive accounts, all accounts, or any custom defined profile on the menu. A user may also create a new profile.

The Records control component allows a user to specify which accounts appear on the current page. This control appears only when there are more records than can be displayed on a single page, but the embodiment is not so limited. The number of items displayed per page may be set with the Preferences screen. For example, if the CIMS is set to display twenty items per page and a user has fifty records, the user may use the records control to display records 1-20, 21-40, or 41-50. The Search button component allows a user to search for accounts matching the criteria which the user can specify on the search screen.

The Communicate button component allows a user to display a communications screen and initiate and establish communications with contacts associated with the selected accounts. The communications comprise mail, facsimile, electronic mail, quote, labels, and envelopes, but the embodiment is not so limited. A user may communicate with one contact or many contacts at once. The Profile button component allows a user to display the Account Profile screen. The Account Profile screen may be used to create, view, edit and delete profiles. As previously discussed, profiles are used to filter records so that a user may see only the records in which the user is interested.

The Account List component allows a user to display accounts with which they are associated according to the selection in the Show drop-down menu. A user may sort the Account List by clicking on a column heading and use the Account List sort arrows to determine the sort order. Clicking on an Account List item twist-down allows for the display of detailed information about the account. For even more detail, a user may click on the underlined account name in the Account List. It should be noted that if a list item contains an underlined e-mail address, telephone number, or Web page address, a user may click on that hyperlink to pop up an e-mail message screen to create and send a message, dial the phone number with an auto dialer, or display the Web page. The edit icon allows a user to edit or delete an account.

A New Accounts screen enables a user to create an account that will be displayed on the account list. The New Account screen is displayed by using the New button. FIG. 18 shows the components of a New Accounts screen of an embodiment of the present invention.

The CIMS electronic bulletin board and news group is a public communications center that enables the discussion of topics or the exchange of messages among co-workers who use the CIMS. The electronic bulletin board may be used to post information about sales events or awards, request help on a project, read company policies, discuss sales techniques, or outline how to win against a competitor, but the embodiment is not so limited. Key words may be used to search for information on the electronic bulletin board. When a user enters the electronic bulletin board, they are presented with a list of topics currently being discussed. Responses to each topic are linked together so that a user may read them sequentially and follow the flow of conversation. A user wishing to add to the conversation may do so by starting a new topic or replying to an existing topic on the electronic bulletin boards screen. Attachments may be added to electronic bulletin board messages, but the embodiment is not so limited. It should be noted that a user wanting to share information about a particular account, deal, or contact might do so by creating an event associated with that account, deal, or contact; in this way the information will reside with the associated account.

The Electronic Bulletin Board screen of the CIMS enables a user to read and participate in discussions among users of the CIMS. FIG. 19 shows the components of an Electronic Bulletin Board screen of an embodiment of the present invention. A user may choose to display messages from the past week, the past month, the past three months, the past six months, the past nine months, or the past year, but the embodiment is not so limited. The Search button is used to find a certain topic heading or word within the body of a message.

A New Message/New Reply screen enables a user to create and reply to topics being discussed among users of the CIMS. FIG. 20 shows the components of a New Message/New Reply screen of an embodiment of the present invention. A Search screen enables a user to search for topics or messages that contain a certain word or part of a word. FIG. 21 shows the components of a Search screen of an embodiment of the present invention.

The CIMS Calendar module provides for displays of lists of appointments and meetings that a user has called or in which a user has agreed to participate. The appointments may be viewed in day, week, or month views, but the embodiment is not so limited. An appointment is different than a to-do item which is managed through the to-do list, but the embodiment is not so limited. An appointment has a specific duration, such as 9:00 a.m. to 11:00 a.m.: for example, a meeting or conference call on Tuesday at 2:00 p.m. A to-do item has a due date and time associated with it, but is not otherwise dependent on specific events at specific times; for example, a call, quote, e-mail, or other task that must be completed by a certain time, but can actually be worked on any time prior to the due date and time.

The calendar may be used to view, edit, and add appointments and meetings. A user may also view public information and add appointments to the calendars of co-workers. Only the creator of an appointment may change (edit) or cancel (delete) the appointment, but the embodiment is not so limited. Co-workers included in the meeting may choose to decline to be involved in the meeting, but the co-workers cannot edit or delete the meeting. If a user schedules an appointment that conflicts with the calendar of a co-worker, a notification appears at the top of the attendee's calendar view. A conflict hyperlink may be clicked on to display the conflict on a pop-up screen and edit the appointment as needed. To see the notification in one embodiment, the calendar must be in either day or week view and be viewing the day that contains the conflict. Calendar appointment times are stored in the CIMS database in Greenwich Mean Time (GMT) and displayed in the appropriate time on the local computer, but the embodiment is not so limited. Thus, co-workers in Montreal, Cleveland, and Los Angeles would each see in their local time an appointment scheduled by a co-worker in Dallas.

Figure 22:
FIG. 22 shows the components of a Calendar screen of an embodiment of the present invention.

The CIMS calendar displays the scheduled appointments for a user and others and enables a user to schedule appointments for themselves and others. A user may include co-workers and contacts in their appointments. The calendar displays the time of the appointment, a public description of the appointment readable to anyone on the CIMS, a private note viewable only to the creator of the appointment, and the account associated with the appointment. FIG. 22 shows the components of a Calendar screen of an embodiment of the present invention.

A New Appointment screen enables a user to create an appointment or meeting that will be displayed on the calendar. Furthermore, a user may create appointments and meetings that will appear on the calendars of their co-workers who are on the CIMS. When an appointment is created, all attendees will be notified of the appointment on their new information screen. Attendees may then accept the appointment by doing nothing or decline by clicking a button. If an appointment is declined, the scheduling user will be notified on their New Information screen. When creating an appointment that is associated with an account, deal, and contact, a reference to the appointment will be saved in the corresponding records. FIG. 23 shows the components of a New Appointment screen of an embodiment of the present invention. Creators of an appointment may edit the appointment, but the embodiment is not so limited.

The Communicate module of the CIMS enables a user to create a mail merge letter, facsimile, quote, and e-mail addressed to contacts of the user, but the embodiment is not so limited. Furthermore, the Communicate module enables a user to create labels and envelopes to contacts of the user. The communicate feature is available on any CIMS screen that displays or has associated contact information, such as the Contact List/Detail screens and the Account List/Detail screens. Communications may be with a single contact or many contacts at once. When transmission of a communication is complete, a record of the communication may be saved in the history of the deal, contact, or account.

In one embodiment the Communicate module uses a mail merge feature to accomplish these tasks, but the embodiment is not so limited.

A CIMS contact is an individual with whom a user communicates, either in relation to a business opportunity or for personal reasons. Depending on the configuration of the CIMS, a user may track various contact information comprising address, title, phone numbers, and e-mail addresses. Regarding business contacts, one or more contacts may be associated with an account and each contact may be associated with one or more deals. The deal is the primary organizing unit in the CIMS. Where accounts and contacts are used to track relatively static information about an organization and its people, a deal tracks the dynamics of a business opportunity. A contact may also have associated to-do items, appointments and history. Furthermore a user may create a personal contact, wherein a personal contact is not associated with an account. Personal contacts are displayed in a contact list of the creating user, but not in any other contact list. A personal contact will not be displayed as part of any account or deal information elsewhere in the CIMS. Therefore, only the creator of a personal contact may see the personal contact. Like a regular contact, a personal contact may have associated to-do items, appointments, and history. Contacts are managed in the CIMS through the Contact List, which enables a user to display a list of contacts, edit existing contacts, and add new contacts to the list. Moreover, the Communicate button is available on the Contact List screen, wherein the Communicate button enables the sending of facsimiles, letters, and e-mail to contacts.

The Contacts List enables the user to display a list of their contacts, add new contacts to the list, and edit existing contacts. FIG. 24 shows the components of the Contact List screen of an embodiment of the present invention. The New Contact screen enables the user to create a contact that will be displayed in the Contact List. The New Contact screen is displayed by using the New button of the Contact List screen. FIG. 25 shows the components of a New Contact screen of an embodiment of the present invention. Contacts may be edited, but the embodiment is not so limited.

A CIMS deal is a potential revenue opportunity. A user may track various deal information, comprising stage, deal size, source, projected close date, and close probability. A deal has an associated account and, optionally, one or more associated contacts, but the embodiment is not so limited. The deal is the primary organizing unit in the CIMS. Where accounts and contacts are used to track relatively static information about an organization and its people, a deal tracks the dynamics of a business opportunity. Furthermore a deal may have associated to-dos, appointments, and history. A CIMS lead is an emerging business opportunity. A lead is the first stage of a deal, a potential deal that has not been qualified. A deal is a potential revenue opportunity that has been qualified and is in the sales pipeline. The CIMS enables a user to enter leads on a New Leads screen, as this is the way typical organizations prefer to organize their sales cycle. A user may also enter leads from the New Deal screen or after entering a contact on the New Contacts screen.

After being entered, leads are managed from the Deal List screen, but the embodiment is not so limited. Deals are managed through the Deal List, which enables a user to display a list of deals, edit existing deals, and add new deals to the list. History keeps track of all events, such as calls and meetings, related to the deal. Information added to or changed in a deal is automatically recorded in the History. History is displayed on the detail screens of the deal itself and the account and contacts associated with a deal. Deal history may be used to get a quick overview of the activities related to a deal and to gain a more accurate picture of where it is in the sales pipeline.

The Deal List enables the user to display a list of their deals, add new deals to the list, and edit existing deals. FIG. 26 shows the components of a Deal List screen of an embodiment of the present invention. A New Deal screen enables the user to create a deal that will be displayed in the Deal List. The New Deal screen is displayed by using the New button of the Deal List screen. FIG. 27 shows the components of a New Deal screen of an embodiment of the present invention. A deal may be edited or deleted, but the embodiment is not so limited.

The CIMS provides the capability to export data to other applications. The Contact List, Deal List, and Account List pages may have their data exported as a text file with tab characters between the data fields, but the embodiment is not so limited. Any application that can read such a tab delimited file, which includes most spreadsheets, databases, and contact managers, may use data exported from the CIMS, but the embodiment is not so limited. The export format of one embodiment automatically converts the CIMS source file into the tab delimited format and downloads it to a hard disk for use with another application. The export function of one embodiment exports all fields in a table, not just the ones shown on a list screen, but the embodiment is not so limited. However the records that are exported may be limited by using the Show drop down menu.

Furthermore the CIMS provides for the importing of account, contact, and deal information from other sources. Any data source that can be exported as a tab, or delimited, file, which most spread sheets, databases, and contact managers can do, can be imported into the CIMS, but the embodiment is not so limited. The CIMS of one embodiment automatically converts the source file and allows a user to specify where the data should go in the CIMS, but the embodiment is not so limited. A number of options may be selected when importing data into the CIMS. There is an option to allow duplicate records to be generated during the import. Another option causes notifications of the imported records to be made on the new information pages of affected co-workers. A further option provides for the saving of unmapped fields of an imported record to a specified field of a specified table if the source file does not have a corresponding CIMS field. Moreover, an option exists to assign imported records to a particular territory. Additionally, an option exists to assigned imported deal records to a deal source.

A CIMS lead is an emerging revenue opportunity. A lead is the first stage of a deal and typically is not fully qualified. A deal is a potential revenue opportunity that has been qualified. Typically, deals are reflected in the sales pipeline. As many sales organizations center their selling process around leads and deals, the CIMS provides a convenient shortcut to enter leads for either an existing account or a new account. To enter a lead for a new account, a user clicks on the New button at the top of one of the following screens: Deal List/Detail screen; Account List; Contact List; or, To-Do List. Upon clicking on the New button a New Leads screen will be displayed. If a user creates a new lead in this manner the following will be created, but the embodiment is not so limited: a new deal; a new account; and, optionally, a new contact. A user manages the new lead through the Deal List. To enter a lead for an existing account, a user clicks on the New Deal button on the Account Detail screen or in the twisted down account detail on the Account List. Once leads have been entered, they may be tracked and analyzed using any of the tools available for deals, including reports and the radar screen. A New Leads screen enables a user to create a lead that will be displayed on the Deal List. Associated account and contact information for this lead will also be displayed on the account list and contact list. FIG. 28 shows the components of a new leads screen of an embodiment of the present invention.

The CIMS meets the objectives of increasing sales and marketing efficiency by functioning to provide a multi-dimensional display of event information to a user. Consequently, the CIMS uses the Radar Screen™ Opportunity Display (RSOD), so named because the display is a radar metaphor. The CIMS uses the RSOD to provide a quick-look of the best business prospects for pursuit by an individual or company. The RSOD depicts business events and transactions in such a manner as to allow a quick and accurate evaluation by the user. Thus, in one embodiment, this radar-like presentation of data allows the user to see a visual representation of the current state of one or more sales transactions.

The CIMS operates on data that is either received via user input or is received from a database containing information relevant to the events of a user company. With reference to FIG. 2, when a database is used the database is hosted in a system memory 104 of the computer system. As data entered into the CIMS by a user is stored by the CIMS, all data used by the CIMS will hereinafter be referred to as being resident in the CIMS database. These events can include, but are not limited to, sales deals, purchases, customer service cases, services to be performed, defect tracking, material issues, contact management, and contract progress. The CIMS utilizes the event data to generate corresponding event objects for display. The event data, or event characteristics as they will be referred to herein, are displayed in a graphical manner on the RSOD in the form of the corresponding event objects. Each event object represents an event from the database. The RSOD is capable of displaying multiple event objects at one time representing multiple events from the database. The display characteristics of each event object are determined by the event characteristics of the corresponding event.

The location of an event object on the RSOD is indicative of characteristics of corresponding events. The location is a multi-dimensional indicator in that it can be specified in terms of both a radial location from a specified point and in terms of sectors or coordinates. First, regarding radial location, an event object is displayed on the RSOD a determined distance from a particular reference point on the display. This particular reference point may be chosen by the user. Generally the particular reference point will be chosen to be, but is not limited to, the central point of the display. As business deals are typically referenced by stages in a pipeline or target dates, this reference point can represent, but is not limited to, some particular target stage or target date of an event. Therefore, the determined distance of an event object from the chosen RSOD reference point represents a related stage or date of the corresponding event. Using a sales deal event as an example, and making the RSOD central reference point representative of completion of the sales deal, the distance the event object is displayed from the central point indicates the proximity to completion of the sales deal. This proximity can be represented by a number of predefined stages away from completion of the deal, or alternatively, an estimated time period away from completion of the deal.

Next, while radial location indicates a characteristic of an event, the sector or coordinate location of an event object may be indicative of a different characteristic of a corresponding event. The RSOD may be divided into numerous sectors or, alternatively, grids defined by some coordinate system. Thus, the location of an event object in a particular sector or grid can be representative of some characteristic of a corresponding event. For example, the sector or grid in which an event object is located may identify the geographical area in which a corresponding event is located, or it may identify the personnel involved in the event, or the probability of event completion, or product line, or type of company, or type of problem.

As the location of an event object on the RSOD can indicate temporally-related event characteristics, then the corresponding event objects can be animated to show the progression and regression of the corresponding events over time. The specified time period for animation can be selected by the user or may be set by the CIMS. Event objects will not obstruct other event objects.

An embodiment of the present invention uses the size, color, and shape of event objects to be indicative of characteristics of corresponding events. Generally, the size of an event object will be chosen to be indicative of a measure of importance of a corresponding event. This measure of importance may be, but is not limited to, the amount of money involved in a corresponding event. For example, an event of interest may be a sales deal where the measure of importance is the monetary value of the sales deal, so the size of the displayed event object would be in direct proportion to the monetary value of the sales deal. While the size of event objects is a quantitative attribute for continuous values, the color and shape of event objects is suited for discrete values.

The size, color, and shape of event objects will each be indicative of an individual characteristic of a corresponding event. These characteristics may include, but are not limited to, the personnel involved in an event, the level of priority of an event, the type of event, the geographical area in which an event is located, the strategic importance of an event, a product line that is the subject of an event, event probability of completion, and an event with the highest probability of completion. For events related to customer support or defect tracking, these characteristics may also include the severity of a problem, the number of interactions with a customer, the number of instances of a problem, the support representative or team assigned to a problem, the type of problem, the type of customer, the product or product line, or the release version of a product.

In order to increase the number of event object variables so as to increase the number of event characteristics which may be displayed, the event objects may have variable fill patterns. For example, an event object may be displayed with a hollow center to represent a lost or failed event.

In order to further increase the number of event object variables so as to increase the number of event characteristics which may be displayed, the event objects may have tails. As with event object location, the event object tail is a multi-dimensional indicator of corresponding event characteristics in that the tail has a variable length and a variable pointing direction. For example, the direction in which the object tail points may indicate whether the event is progressing towards or regressing away from a specified date or stage while the length of the object tail may represent a speed at which the corresponding event is progressing or regressing relative to the specified date or stage. Additionally, the object tail may contain tail end symbols or different types of tails which are indicative of a different characteristic of a corresponding event.

Preferably, the CIMS is configurable for individualized use so as to provide information relevant to a specific user's position in the company. In this way, the CIMS can provide a visual representation of data presented for a specific person, team, or region, as well as for the entire company. Thus, for example, a sales person may view his individual deals displayed on the screen, while the chief executive officer or vice president of sales might see all deals of the entire company displayed on the screen. In this way, the CIMS can function to present event information so as to increase sales and marketing efficiency at all levels of a company. Also, a user can configure the CIMS to select event data based on any standard database queries including, but not limited to, monetary value, product line, time period, or other event characteristics. In addition, the event objects displayed on the RSOD provide electronic links to detail pages which contain detailed information relative to corresponding events.

FIG. 29 shows the components of the RSOD screen of an embodiment of the present invention. The probability of closing of one embodiment is the estimated likelihood of a deal resulting in a sale, expressed as a percentage. The days until closing of one embodiment is the estimated number of days until a deal is expected to close; the closer the deal is to the center, the closer the projected closing date of the deal is to the date specified in the From date field. The deal stages of one embodiment are the names used by the hosting organization to describe phases of their deal pipeline, such as lead, qualified, or closed.

Figure 30:
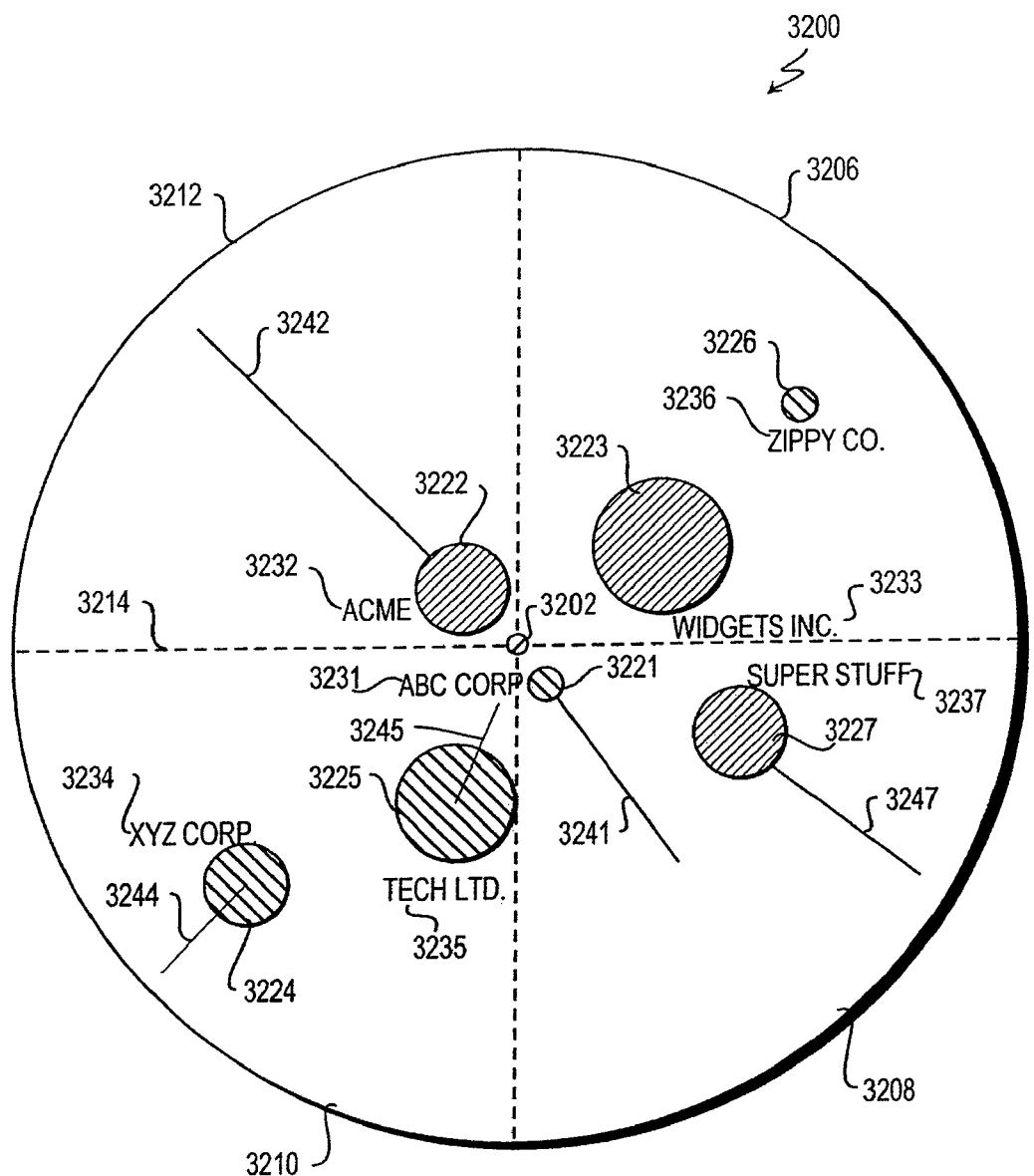
FIG. 30 shows an embodiment of a Radar Screen™ Opportunity Display (RSOD) implemented by the present invention.

FIG. 30 shows an embodiment of a Radar Screen™ Opportunity Display (RSOD) 3200 implemented by the present invention. The RSOD 3200 of this embodiment is circular in shape. The RSOD 3200 displays event objects 3221-3227 which correspond to events of the CIMS database or user input. FIG. 31 shows a sample table 3250 of event characteristics 3254-3262 upon which the RSOD 3200 implementation of FIG. 30 is based in an embodiment of the present invention. The sample table 3250 contains event characteristics 3254-3262 for seven events 3270-3282 illustrated by example on the RSOD 3200. The event characteristics 3254-3262 of this embodiment include, in addition to an event name 3252, five categories of event characteristics 3254-3262 relating to each event.

The data selected for presentation in FIG. 31 is by way of representation, and the event name 3252 and event characteristics 3254-3262 are not limited to the type or amount of data shown. The CIMS may operate on any event characteristic that is selected for input into the database. As such, a CIMS database may receive and store a large number of event characteristics. In contrast, the amount of data displayed on the RSOD is limited to the number of event object variables accommodated by the RSOD. Accordingly, an event object shown on an RSOD display will not generally be based on all information in the CIMS database corresponding to a particular event. The reason is that the CIMS database will generally contain more event characteristics corresponding to a particular event than the event object will have variable parameters. Therefore, the CIMS must limit the characteristic event data displayed corresponding to an event to the number of variable parameters of the corresponding event object.

The user of the CIMS has options as to the event data displayed by the RSOD in the form of the event objects. The user may choose to select characteristic event data for all corresponding event object variables. If the user elects not to select characteristic data to represent all event object variables, the CIMS will select the remaining characteristics using a default routine. If the user selects a number of characteristics for display that is less than the number of event object variables, then the CIMS may be configured to either cause the RSOD to display the event objects based just on the characteristics chosen by the user, or to cause the CIMS to select the remaining event characteristics to be displayed using the default routine. The default routine selection of characteristics could be based on a number of factors including, but not limited to, a prioritized list of default characteristics, or default characteristics most often selected by other users of the CIMS.

The event characteristics table 3250 of this embodiment presents event characteristics 3254-3262, by company name 3252, in five categories. These five categories correspond to company size 3254, event territory 3256, event completion date 3258, event stage as of the current date 3260, and event stage as of one month ago 3262. These event characteristics represent characteristics of the event or transaction with the particular named company 3252. The size characteristic 3254 presents the size of the event in dollar value. The territory characteristic 3256 presents the geographical location of the event. The completion date characteristic 3258 represents the anticipated date of completion of the event. The stage (Today) characteristic 3260 represents the stage of the deal as of the current date. The stage (1 month ago) characteristic 3262 represents the stage of the deal as of one month prior to the current date.

FIG. 32 shows example scale and note information 3500 that may accompany the RSOD 3200 of an embodiment of the present invention. This scale and note information 3500 may be displayed along with the RSOD 3200, and provides the information necessary to interpret the event characteristics 3254-3262 from a graphical representation of the event data on the RSOD 3200. This scale and note information 3500 will be used in the following description of the RSOD display 3200. As the event characteristics table 3250 contains five event characteristics 3254-3262 for representation on the RSOD 3200, five variables of the event objects will be controlled by these characteristics 3254-3262. The event object variables controlled in this embodiment include event object size, distance of event object from center of RSOD, event object tail length, direction that event object tail points, and quadrant location of event object. Each of these five event characteristics 3254-3262 is discussed below with regard to the example RSOD 3200 display.

The scale information 3510 of FIG. 32 indicates that the event size data 3254 is related to the size of the event object 3221-3227 displayed on the RSOD 3200 by the relationship that 0.25 inches of event object diameter equals $50,000 in deal size. Using this example, the ABC Corporation event 3270 is represented by a 0.25 inch diameter event object 3221, the ACME event 3272 is represented by a 0.75 inch diameter event object 3222, the Widgets Inc. event 3274 is represented by a 1.25 inch diameter event object 3223, the XYZ Corporation event 3276 is represented by a 0.50 inch diameter event object 3224, the Tech Ltd. event 3278 is represented by a 1.0 inch diameter event object 3225, the Zippy Co. event 3280 is represented by a 0.25 inch diameter event object 3226, and the Super Stuff event 3282 is represented by a 0.75 inch diameter event object 3227. The CIMS actually scales to pixels so that the resulting size of the event objects will vary by display device.

The scale information 3510 of FIG. 32 indicates that 0.5 inches of distance from the RSOD center 3202 represents an estimated one month of lead time, or one month from the current date to the date of closing. Using this example, the ABC Corporation event object 3221 is 0.25 inches from the RSOD center 3202 representing one-half month until event completion, the Acme event object 3222 is 0.5 inches from the RSOD center 3202 representing one month until event completion, the Widgets Inc. event object 3223 is one inch from the RSOD center 3202 representing two months until completion, the XYZ Corp. event object 3224 is two inches from the RSOD center 3202 representing four months until completion, the Tech Ltd. event object 3225 is one and one-half inches from the RSOD center 3202 representing three months until completion, the Zippy Co. event object 3226 is two inches from the RSOD center 3202 representing four months until completion, and the Super Stuff event object 3227 is one and one-half inches from the RSOD center 3202 representing three months until completion.

Generally, the information displayed by an event object tail is two-dimensional. In this example, the direction in which the tail is pointing indicates qualitatively the direction from which the event has progressed or regressed. Furthermore, the scale information 3510 of FIG. 32 indicates quantitative information in that one inch of tail represents one stage moved in the past month. The note information 3520 of FIG. 32 indicates that stage 1 is the beginning stage and stage 5 is the target stage, such as getting a deal booked. Using this example, the ABC Corporation event object 3221 two-inch tail 3241 indicates that the ABC event 3270 progressed two stages in the past month, and tail 3241 direction indicates that the ABC event 3270 progressed towards a target stage. Regarding the Acme event 3272, the event object 3222 three-inch tail 3242 indicates that the Acme event 3272 progressed three stages in the past month towards a target stage. Regarding the Widgets Inc. event 3274, the absence of an event object 3223 tail indicates that the Widgets event 3274 did not progress or regress in the past month. Regarding the XYZ Corp. event 3276, the event object 3224 one inch tail 3244 indicates that the XYZ event 3276 progressed one stage in the past month towards a target stage. Regarding the Tech Ltd. event 3278, the event object 3225 one inch tail 3245 indicates that the Tech event 3278 regressed one stage in the past month away from a target stage. Regarding the Zippy Co. event 3280, the absence of an event object 3226 tail indicates that the Zippy Co. event 3280 did not progress or regress in the past month. Regarding the Super Stuff event 3282, the event object 3227 two inch tail 3247 indicates that the Super Stuff event 3282 progressed two stages in the past month towards a target stage.

The sector information 3530 of FIG. 32 indicates that the event objects 3221-3227 are organized in a quadrant 3206-3212 of the RSOD 3200 depending on the geographical location of the event. The quadrants are indicated by quadrant lines 3214. Accordingly, the Zippy Co. event 3280 and the Widgets Inc. event 3274 are in the northeast territory because the Zippy Co. event object 3226 and the Widgets Inc. event object 3223 are located in the top right quadrant 3206 of the RSOD 3200. The ABC Corp. event 3270 and the Super Stuff event 3282 are in the southeast territory because the ABC Corp. event object 3221 and the Super Stuff event object 3227 are located in the bottom right quadrant 3208 of the RSOD 3200. The Tech Ltd. event 3278 and the XYZ Corp. event 3276 are in the southwest territory because the Tech Ltd. event object 3225 and the XYZ Corp. event object 3224 are located in the bottom left quadrant 3210 of the RSOD 3200. Finally, the Acme event 3272 is in the northwest territory because the Acme event object 3222 is located in the top left quadrant 3212 of the RSOD 3200.

Figure 33:
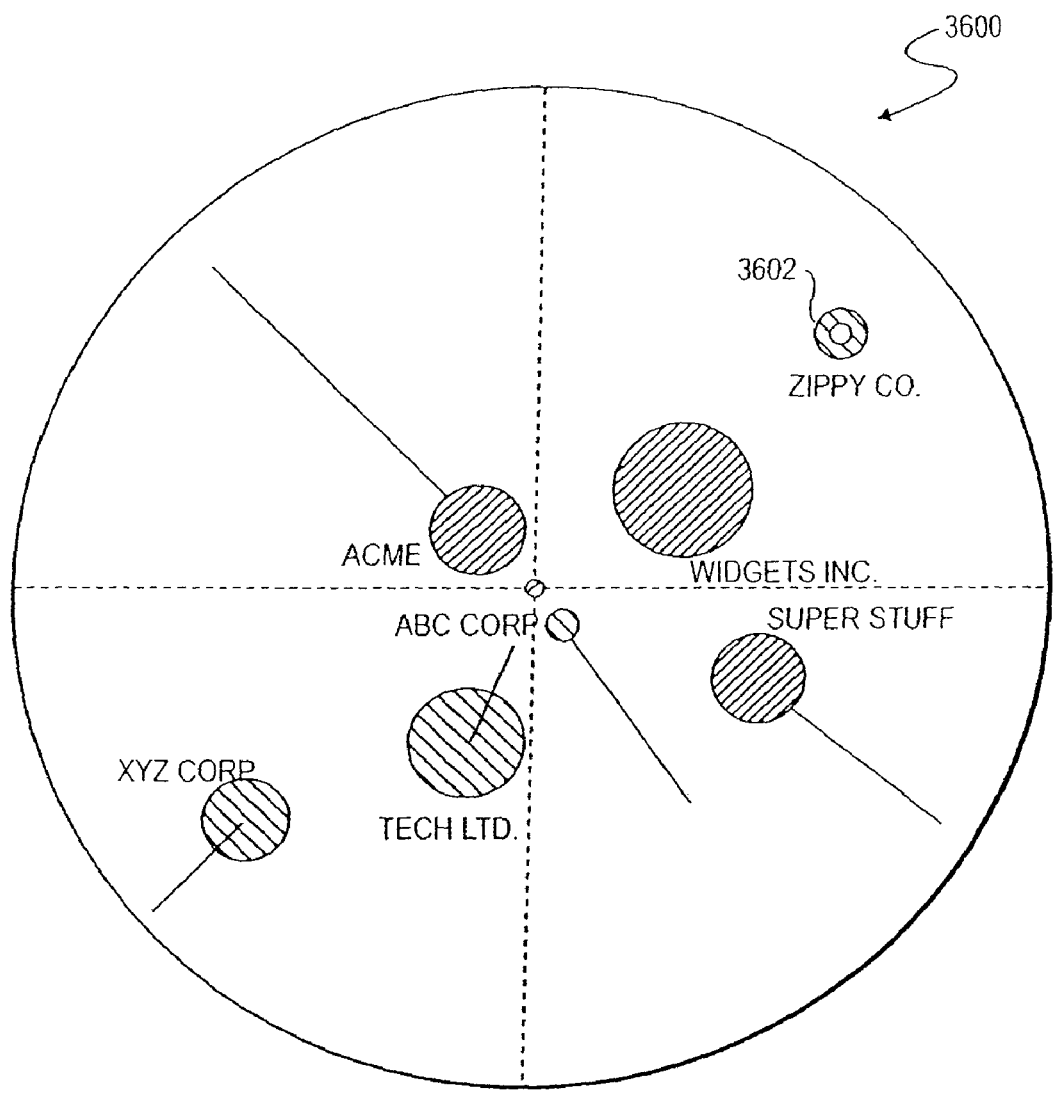
FIG. 33 illustrates another embodiment of a RSOD implemented by the present invention.

FIG. 33 shows another embodiment of a RSOD 3600 implemented by the present invention. FIG. 34 shows a sample table 3700 of event characteristics upon which the RSOD 3600 implementation of FIG. 33 is based. The RSOD 3600 of this embodiment displays event object 3602 as an event object with a hollow center. The hollow center of event object 3602 is indicative of a lost or failed event. The distance from the center of the RSOD to event object 3602 indicates how close the event got to completion before the loss or failure occurred.

Figure 35:
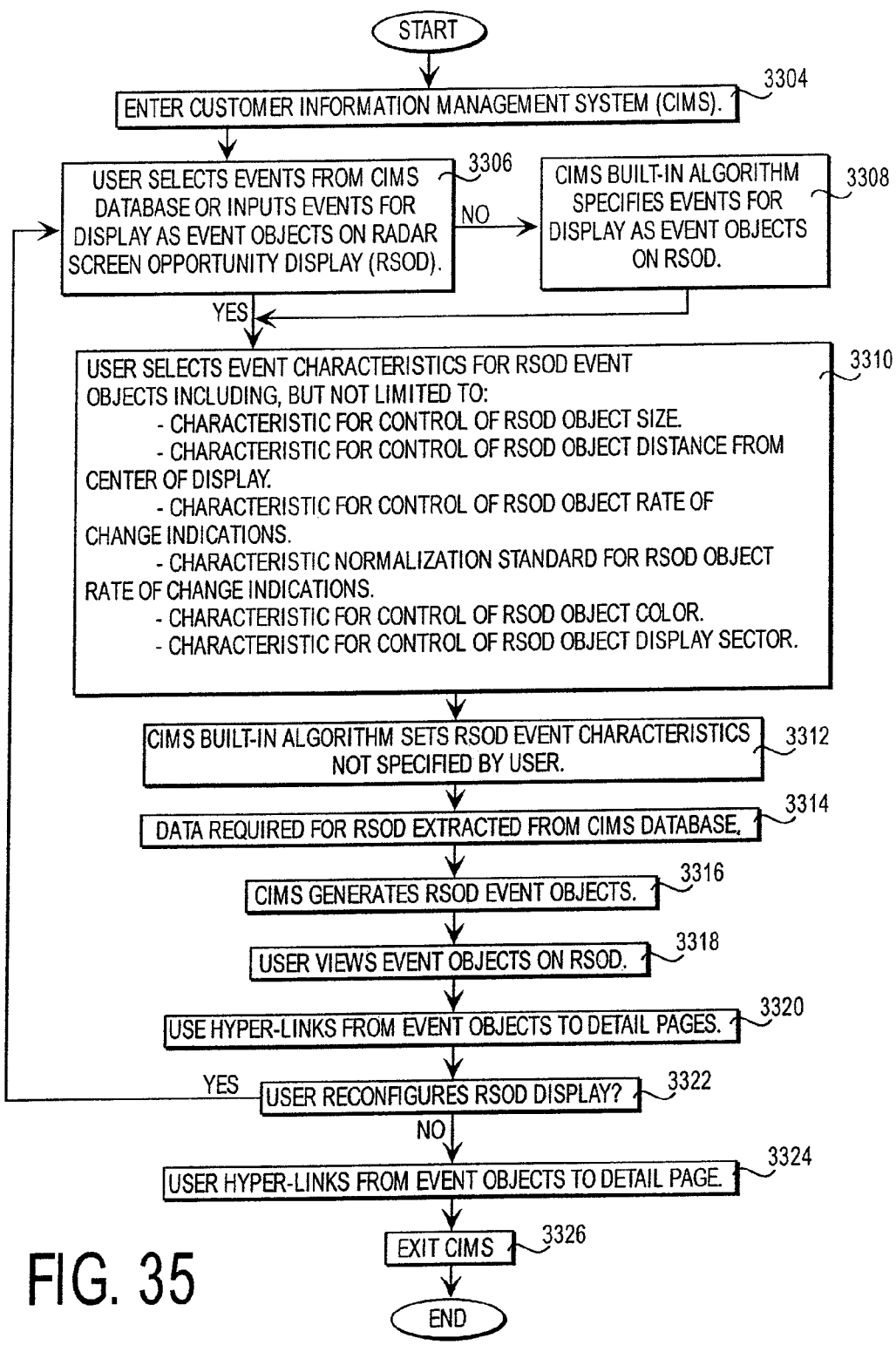
FIG. 35 shows a flow diagram for the operation of the Customer Information Management System (CIMS) in an embodiment of the present invention.

FIG. 35 shows a flow diagram for the operation of the Customer Information Management System (CIMS) in an embodiment of the present invention. Operation begins at step 3304, at which a user enters the CIMS. The user selects an event from the CIMS database for display as a event object on a RSOD, at step 3306. The CIMS contains a computer database, or is electronically linked to a computer database. This database contains a record of all company contacts and interactions relating to company events, deals, and transactions with client and customers. This flow diagram presumes that event characteristic data have previously been entered into the CIMS database. The RSOD provides a visual representation of the events in a radar screen format.

In selecting an event from the CIMS for display on the RSOD, the user may select specific events for display. For example, the user might want to see displayed the events of Company A, Company B, Company F, Company R, Company Y, and Company Z. Alternatively, the user may specify events for display on the basis of event characteristics. The event characteristics on which display may be specified include any characteristics of an event that are resident in the database or which are input by the user during a particular CIMS session. For example, a salesperson user might want to display pending sales deals of a certain type based on the dollar value of the deals. Following selection of events for display by the user, operation continues at step 3310. If the user does not select any events for display, operation continues at step 3308.

If a user does not select any events from the CIMS database for display, operation continues at step 3308, at which a built-in algorithm determines the events for display on the RSOD. In the complete absence of user input, the algorithm may select events for display based on, but not limited to, predetermined event characteristics, event characteristics most often requested in prior use by a particular user or group of users, or rate of change of event characteristic trend data. This algorithm may also be configured by the user or by a system administrator in order to display certain events. For example, the user may specify a number or type of event to be displayed, adjust the relative weight of the event characteristics, or indicate which event characteristics should be taken into account in formulating a display.

Following selection of the events for display from the CIMS database, operation continues at step 3310, at which the user selects configuration options for RSOD event objects. The CIMS operates by formulating an event object for display based on corresponding event characteristics resident in the CIMS database or input by a user. The size, shape, color, location, and object tail of each event object are determined by event characteristics of a corresponding event. As such, each of these event object attributes are indicative of the event characteristics selected by the user to represent these attributes. Each of these event object attributes will now be discussed.

The size of an event object on the RSOD generally represents, but is not limited to, the relative importance of the corresponding event. As such, the size of the event object represents the size of the potential deal, in revenue or units, or the strategic importance of the deal. The size of the transaction object may also represent the qualitative value of a particular event. In addition, size may represent the probability of closing a transaction, the expected value of a transaction, or the number of interactions with a customer. Event object size may also be used for tracking product defects, product types and releases, assigned representatives, and types of calls. In tracking product defects, event object size can be indicative of the size of the problem and to the number of other defects related to the same problem or same product.

The shape of an event object may be indicative any one of a number of qualitative characteristics of an event. The qualitative characteristics that may be represented by event object shape include, but are not limited to, the category of an event, the assigned company representative, the probability of completing an event, the strategic importance of an event, the product line being sold, the territory, the defects of a product, the industry in which a company deals, and the type of event (e.g., ongoing contract or a one-time sale). The quantitative characteristics of an event that may be represented by event object shape include, but are not limited to, the priority of an event, the value of an event, the time to completion of an event, the size of a company, the size of an event, and the stage of an event. Event object shape may also be used for tracking product defects, product types and releases, and types of calls. Thus, the shape of an event object may be indicative of any characteristic of the transaction found in the database.

The color of an event object may be indicative of any one of a number of qualitative characteristics of an event. The qualitative characteristics that may be represented by event object color include, but are not limited to, the category of an event, the assigned company representative, the probability of completing an event, the strategic importance of an event, the product line being sold, the territory, the industry in which a company deals, and the type of event (e.g., ongoing contract or a one-time sale). The quantitative characteristics of an event that may be represented by event object color include, but are not limited to, the priority of an event, the value of an event, the time to completion of an event, the size of a company, the size of an event, and the stage of an event. As an example, the color of an event object may be red for an event having a highest level of severity with regards to a particular characteristic, blue for an event having a medium level of severity with regards to the particular characteristic, and yellow for an event having a lowest level of severity with regards to the particular characteristic. Thus, the color of an event object may be indicative of any characteristic of the transaction found in the database.

The location of an event object on the RSOD is a multi-dimensional attribute because it is indicative of multiple characteristics of the corresponding event. As such, a radial location of an event object on the RSOD may represent one characteristic of a corresponding event while the sector or grid location of the event object may represent another characteristic of the transaction. For example, a radial location of an event object on the RSOD may represent the stage of a corresponding event, or the length of time a call has been open. Additionally, a sector or grid location of the event object on the RSOD may represent the geographical location of the corresponding event.

Regarding the radial location of an event object, generally a particular point on the RSOD will be chosen to represent a specific stage or date in the lineage of an event. As such, the radial location of an event relative to this particular point may represent the stage of a transaction. For example, in one embodiment the center of the screen is chosen to represent the completion date of an event. The radial distance from the center of the RSOD is thus determined by the stage of the sales pipeline in which an event is currently found relative to a final or target stage. Examples of these discrete stages include, but are not limited to, raw lead, prospect, qualified prospect, field call required, decision pending, booked, shipped, accepted. Alternatively, the radial distance from the center of the RSOD to an event object may be determined by the amount of time between the specified or target date of event completion and the current date. The radial location of an event object may also be determined by the probability of the transaction closing. The CIMS will allow the user to enter pipeline stages or dates for the relative comparison, to choose between choices of stages or dates, or to make no selection of stages or dates in which case the CIMS has default stages and dates.

Regarding the sector location of an event object, the RSOD can be divided into sectors, and the sectors can be selected to represent an event characteristic. For example, the sectors can indicate the sales representative or team which is responsible for an event, the category of the company, the strategic importance of the company, the product line, the product defects, type of call, the size of the company, or the stage of an event in the sales pipeline. The sector representation, however, is not limited to the aforementioned event characteristics.

In addition to the aforementioned event object attributes, each event object may have an object tail. The event object tail is a multi-dimensional indicator of event characteristics. For example, the object tail may represent an aspect of the past history of a particular event. As the object tail has at least two variables, the direction in which the tail points and the tail length, the object tail may represent at least two event characteristics or, alternatively, one two-dimensional event characteristic.

In one embodiment of the present invention, the object tail represents the stage of a particular event relative to a specified stage by indicating the progression or regression of a corresponding event relative to the specified stage. The progression/regression characteristic is a two-dimensional characteristic in that the event can be progressing, or moving towards a specified stage, or the event can be regressing, or moving away from a specified stage. The direction in which the object tail points indicates whether the event is progressing or regressing. The second dimension indicated by the object tail is the associated speed at which the event is progressing or regressing. The length of the object tail indicates the speed at which the event is moving.

In another embodiment of the present invention, the object tail represents the progression or regression of a corresponding event relative to a specified date. In this embodiment, when the event is progressing towards a specified date, the tail of the event object points towards the particular point on the RSOD chosen to represent the specified date of interest. When the event is regressing away from a specified date, the tail of the event object points away from the particular point on the RSOD chosen to represent the specified date of interest. When the event is neither progressing nor regressing, there may be no tail displayed, or a particular type of tail might be displayed to indicate no change in the event. Event progression/regression can be measured by, but is not limited to, comparison to a relevant specified date, stage of event in a pipeline, or increase or decrease in the probability of event closing.

Additionally, the speed associated with the progression or regression of the event is represented by the length of the object tail. The speed can be measured relative to, but is not limited to, a specific date, the speed with which the event passes through a series of stages, by how quickly the probability of event closing fluctuates, or how the time of event closing is adjusted. In order to be representative of speed, the tail length must be normalized relative to a standard. As an example, the tail length can be selected to be normalized relative to all events displayed on the RSOD. Also, the tail length can be normalized relative to some specified period of time (e.g., for the last month). Furthermore, the tail length can be normalized between some particular type of deals of a specified number of deals, whether or not all of these deals are displayed on the RSOD. The normalization standard may be selected by the CIMS user or by a CIMS algorithm.

As the CIMS can display event objects in a way indicative of the past history of a corresponding event, the CIMS may also animate the history of an event. This animation is accomplished by replaying the movement on the RSOD of the event object as reflected by changes in the corresponding characters over a specified period of time. This replay allows the user to view a time history of the progression and regression of an event for a period of interest.

An event object display on the RSOD includes an object label. This label can be input by the user, selected by the user from a list of options supplied by the CIMS, or generated by a default algorithm in the absence of a user selection. The object label displays an attribute of the object from the database. Either the event object label or the event object itself may serve as an electronic link to a detail page containing detailed information about the particular event.

FIG. 36 shows a sample detail page 3400 for an embodiment of the present invention. A detail page for each event contains information relating to the particular event. The detail page might include a record of interactions or contacts with the opportunity company. Furthermore, the detail page may include a complete history of interactions with the opportunity company. Moreover, the detail page could be accessed via an address on the worldwide web, or simply a page that displays information that is known within the application about the event. The detail page 3400 of FIG. 36 includes as an example of the type of information that might be contained in a detail page, but is not limited to, company name 3402, company address 3404, company phone number 3406, industry in which company participates 3408, number of employees 3410, revenue 3412, credit rating 3414, electronic (Internet) address 3416, territory 3418, deal size 3420, expected closing date 3422, and stage of the event as of a certain date 3424.

Following user selection of configuration options for RSOD transaction objects at step 3310, operation continues at step 3312, at which a built-in algorithm determines the event characteristics on which the displayed event object size, shape, color, location, and object tail will depend. If the user does not select any characteristics at step 3310 to control the display, the algorithm will select all characteristics. If the user selects some characteristics at step 3310, the algorithm will select the remaining characteristics. If the user selects all characteristics at step 3310 for control of the display, the algorithm will not select any characteristics and operation will continue at step 3314. As previously discussed, this algorithm may also be configured by the user in order to display certain events. For example, the user may specify a number or type of event to be displayed, adjust the relative weight of the event characteristics to prioritize which event to display, or indicate which event characteristics should be taken into account in formulating a display.

Following step 3312, operation continues at step 3314, at which the CIMS loads from a database all event characteristics required for generation of a RSOD of the corresponding events. As previously discussed, the characteristics may be selected by a user or selected by the CIMS. The CIMS generates the event objects and displays the event objects on the RSOD corresponding to an event, at step 3316. The event objects are displayed according to the event characteristics selected to control the display. At step 3318, at which a user views the event objects displayed by the CIMS on the RSOD. Upon viewing the event objects, operation continues at step 3320, at which the user may link from specific event objects to corresponding event detail pages. When the user no longer wishes to view a detail page, they may link back to the RSOD display.

Operation continues at step 3322, at which, upon viewing the event objects of the RSOD, the user may wish to reconfigure the RSOD to display different events, or the user may wish to reconfigure the RSOD in order to change the event characteristics depicted by the event objects. In this case, operation continues by returning to step 3306 whereby the user will have the configuration options as previously discussed. If the user does not wish to reconfigure the RSOD after viewing it, operation continues at step 3324, at which the user may link to and from corresponding event detail pages so as to gather information on corresponding events. Upon completion of an information gathering session using the RSOD, the user exits the CIMS, at step 3326.

As previously discussed, the CIMS of one embodiment uses three record retrievable methods; Search, Find, and Profiles. FIG. 37 shows a summary of the differences between the three record retrievable methods of an embodiment of the present invention.

The CIMS uses Find as a quick method of locating all records in CIMS that contain a certain word or characters. Find searches the Account Name field, contacts first and last name fields, and field description. Find options comprise an exact match, starts with match, and contains match. The Find screen enables a search of the CIMS database for a record that contains a specified character. FIG. 38 shows the components of a Find screen of an embodiment of the present invention.

Figure 39:
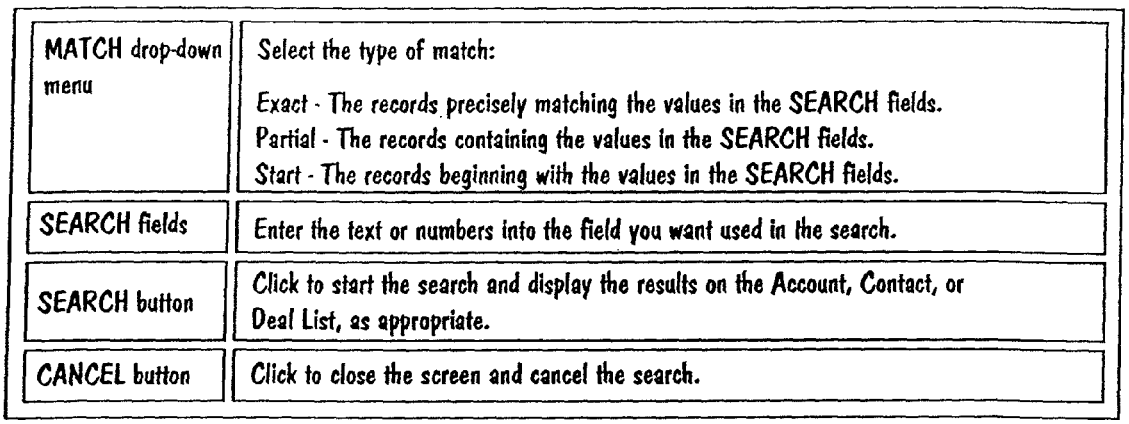
FIG. 39 shows the components of the Search screen of an embodiment of the present invention.

The CIMS uses Search to locate records that match a certain set of criteria. For example, on the Deal List screen, a user can search for all deals of a certain size in a certain deal stage. The Search button appears on the Account list, Contact list, and Deal list. When a user selects the Search button a Search screen with the appropriate account, contact, or deal search fields displays. Although the Search screen has different fields for each type of search, all searches are performed in the same way: define the values wanted for each field, determine the type of match wanted; and, click a button to begin the search. The search matches of one embodiment comprise exact match, starts with match, and partial match. Following execution of the search, the CIMS returns to the list screen from which the search was started. The screen will display the results of the search and the Show menu will be set to current search results. FIG. 39 shows the components of the Search screen of an embodiment of the present invention.

The CIMS of one embodiment uses Profile to locate records that match a certain set of criteria. The CIMS is provided with a predefined set of profiles that may be used to located certain types of records. For example, on the Contact List screen a user may select the Active Contacts profile to display their active contacts only, or the user may select the Personal Contacts profile to display their personal contacts. The user may return to viewing all contacts by using the All Contacts profile. The CIMS provides for the definition of custom profiles. For example, a new profile can be defined that will locate all deals over $1,000,000 with a 30-60% chance of closing. The profile button appears on the Account List, Contact List, and Deal List. Upon selection of the Profile button, a list of custom profiles for the given record type is displayed. This list may be used to edit or delete profiles. A new profile may be created by clicking the New Profile button. New profiles are created by naming the profile, entering a short description, selecting a profile access (private or shared), defining selection criteria, and saving the profile. Once created, a custom profile is displayed on the Show drop down menu on the List screen. FIG. 40 shows the components of a profile screen of an embodiment of the present invention.

Finding information in the CIMS differs from searching in that Finding relies on simple matching in key fields. The CIMS Search feature should be used if a user wants to search on fields other than the key fields used by Find or if a user wants to search on multiple fields at one time. Finding differs from Searching in that it can look up contacts, deals, and accounts at the same time. Searching works only on the records managed from the List screen from which the search is accessed. For example, if a user starts Searching from the Deal List, the Search will only be performed on Deal records.

Profiles differ from Finding and Searching in that Profiles allow for more advanced selection criteria. For example, Profiles can do "greater than" or "less than" comparisons. Furthermore, Profiles may be range comparisons. The Search of one embodiment is limited to exact match, contains, and starts with. In contrast, Profiles may do these comparisons and others. Furthermore, Profiles differ from Searching in that Profiles may be saved for future use.

The CIMS of one embodiment provides two types of reports, informational and analytical, for tracking and analyzing deals, accounts, and contacts, but the embodiment is not so limited. Informational reports are designed primarily for hard copy printing, but the embodiment is not so limited. The informational reports list available information, such as Contact Lists, Deal Lists and To-Do items. The analytical reports are designed to answer pertinent questions, such as "How effective are our marketing programs?" and "How well did leads move through the pipeline?"

The analytical reports are designed for on-screen use. Analytical reports observe trends and pinpoint potential problems and improve areas in a sales process, but the embodiment is not so limited. Analytical reports may be printed, but the embodiment is not so limited. Many analytical reports present summary information. For example, a user may want to know how many deals were generated by a certain trade show. On the analytical report the user might see an underlined number "27". This would indicate that 27 deals where generated by that trade show. Instead of listing every deal, the user was presented with the summary level information. If the user wishes to see more detailed information, then the user clicks on the underlined number "27". The CIMS will then show a list of those 27 deals. More detailed information may be presented for a particular deal by clicking on that deal in the list.

The CIMS provides a predefined set of the most useful analytical and informational reports, but the embodiment is not so limited. Furthermore, the CIMS provides the option to configure each report before it is run. For example a user may request to see only contacts in Minnesota that only deal with a value of over $500,000.00. Report configurations may be saved for reuse, but the embodiment is not so limited.

The analytical reports that follow are available in the CIMS, but the embodiment is not so limited:

Marketing effectiveness: how effective are our marketing programs?
  Average days: how long did it take for closed deals to move through the seller pipeline?
  Deal stages: what stages are deals in?
  Closing probabilities: what is the probability of deals closing?
  Historical snapshot: how many deals were in the seller pipeline?
  Deal fallout: how many deals fell out at each stage?
  Stage-to-stage analysis: within a period of time how long did it take for deals to move from one stage to another?

The informative reports that follow are provided by the CIMS, but the embodiment is not so limited:

To-do: to-do list.
  Calendar: day view, week view, and month view.
  Accounts: accounts list, account detail.
  Contacts: contact list, contact detail.
  Deals: pipeline summary, pipeline detail.

The CIMS To-Do List provides an overview of tasks that have been assigned by the user to the user or have been assigned by co-worker to a user. The CIMS provides for tracking and updating of the status of the to-do item and the display of detailed information about the to-do item. The to-do items may be sorted by due date, type, priority level, and other fields. The to-do items are managed through the To-Do List, which enables a user to view, create, edit, and assign to-do items. To-do items may be marked as completed. When to-do items are created by a user for co-workers, those items will automatically be updated in the CIMS database for the co-workers to-do on their To-Do Lists. The recipient of a to-do may also receive notification in the New Information screen, but the embodiment is not so limited. The progress of to-do items that have been assigned to others through a users own to-do list may be tracked, but the embodiment is not so limited. FIG. 41 shows the components of a To-Do List screen of an embodiment of the present invention.

A New To-Do screen of the CIMS provides for the creation of a new item for a to-do list. The to-do items may be created for a user or may be assigned to other users. The New To-Do screen is displayed upon selection of the View button. When creating a to-do item, it is important to associate it with an account, deal, and contact if the to-do item is to be displayed on the detailed view of Accounts, Contacts, or Deals. FIG. 42 shows the components of a New To-Do screen of an embodiment of the present invention. To-Do List items may be edited or deleted, but the embodiment is not so limited.

A New Information screen provides a quick overview of new and updated information available in the CIMS system, such a change to an account or notification of a meeting, but the embodiment is not so limited. The New Information screen also provides for the monitoring of Web pages and the notification of any changes to those Web pages. The selection of the New Information screen for display instantly provides a summary of important new or changed information that is pertinent to the user. In one embodiment, items on the New Information screen are linked so that a user can navigate quickly to a specific piece of information. When a user is logged-in to the CIMS environment, a New Information icon will flash if someone adds or changes information that is of importance to the user. Clicking the New Information icon allows the user to see, or access, the new or changed information.

New Information items that have not yet been read are listed in bold type, and items that have been read are listed in regular type, but the embodiment is not so limited. New Information items may be selected for reading by either clicking on the hyperlink associated with the item or clicking the New Information item twist-downs. Items on the New Information screen are divided into three main categories, but the embodiment is not so limited: new; changed; and overdue. Within these categories, items are broken down by type: contacts; deals; accounts; to-dos; appointments; web pages; and events. Sections will be collapsed or expanded by using the New Information item twist-downs, but the embodiment is not so limited. FIG. 43 shows the components of a New Information screen of an embodiment of the present invention.

The New Information Web Monitoring Preferences screen provides for the specification of Web pages to be monitored. When a change occurs on a monitored Web page, a user is notified on the New Information screen. FIG. 44 shows the components of a New Information Web Monitoring Preferences screen of an embodiment of the present invention.

The New Information/New Web Page To Monitor screen enables the specification of a page to monitor. The New Information/New Web Page To Monitor screen is accessed from the Web Page Monitoring Preferences screen. FIG. 45 shows the components of a New Information/New Web Page To Monitor screen of an embodiment of the present invention. It should be noted that a change is considered to be any text change on the specific web page being monitored, but the embodiment is not so limited. A user will not be notified of changes to pages linked to the monitored page. When entering the URL, or Web address, of the page to be monitored for changes, the monitored page may be a specific page when it accompanies a home page. For example, a user might not want to monitor www.widget.com (the home page), but the user may want to monitor www.widget.com/pressrelease-.html (the page with new press releases). Furthermore, if a URL is edited and the URL is associated with an account, the URL in the associated account record will be automatically updated. Moreover, the reverse is true, wherein if a URL associated with an account is updated in an account record, the monitored URL will also change.

Thus, a method and apparatus for network-based sales force automation have been provided. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method comprising:
providing, over a network, shared information regarding a transaction, wherein
the transaction comprises one or more deals, one or more contacts, and one or more accounts, and
the one or more deals are associated with the one or more contacts and the one or more accounts;
importing the shared information regarding the transaction from an external source, wherein
the shared information is imported into shared information tables; and
generating, from the shared information tables, an event characteristics table, wherein
the event characteristics table comprises one or more data items generated from the shared information contained in the shared information tables,
each of the one or more data items is associated with one or more of the deals,
the one or more data items are used to generate one or more display objects for a graphical display,
each of the one or more display objects represents a deal of the one or more deals, and
display characteristics of each display object graphically indicate characteristics of the deal.

2. The method of claim 1, wherein
the importing comprises
gathering the shared information from the external source, and
writing the shared information to the shared information tables according to an import template, wherein
the import template indicates import parameters that are used to translate the shared information into records of the shared information tables.

3. The method of claim 2, wherein the import template indicates that fields of the external source are mapped to corresponding fields in the shared information tables.

4. The method of claim 2, wherein the writing the shared information implements a processing script that validates, filters, and formats the shared information for importing.

5. The method of claim 2, further comprising:
defining additional import parameters, wherein
the defining is performed by a user,
and the import parameters specify at least one of whether duplicate records are written to the shared information tables, whether default values are added to one or more fields of the shared information tables, whether imported records trigger a notification, and whether a territory is assigned to an imported record when the imported record does not explicitly specify a territory.

6. The method of claim 1 further comprising:
performing said importing automatically on a periodic basis.

7. The method of claim 1, wherein the shared information regarding the transaction comprises information regarding a contact of the one or more contacts, a description, a projected closing date, a stage, a rating, a probability of closing, a territory, a source, and an estimated revenue.

8. The method of claim 1, wherein the shared information regarding the transaction comprises information regarding a deal of the one or more deals that comprises summary deal information, detailed deal information, a complete history of events associated with the deal, and access to a network web site of at least one customer associated with the deal.

9. The method of claim 1, wherein the shared information regarding the transaction comprises information regarding an account of the one or more accounts that comprises summary account information, detailed account information, a complete history of events associated with the account, and access to a network web site of a customer associated with the account.

10. The method of claim 1, wherein the shared information regarding the transaction comprises information regarding a deal of the one or more deals that comprises a history of each contact, appointment, and event associated with the deal, wherein communication with a representative of the deal is automatically established using the information regarding the deal.

11. The method of claim 1, wherein the shared information regarding the transaction comprises information regarding a contact of the one or more contacts that comprises a history of activities associated with the contact, wherein communication with a representative of the contact is automatically established using the information regarding the contact.

12. The method of claim 1, wherein the transaction further comprises at least one lead, wherein the at least one lead is an emerging business opportunity.

13. The method of claim 1, wherein the external source comprises at least one of an application, a spreadsheet, a web site, a database, and a contact manager.

14. The method of claim 1, wherein
said importing comprises at least one of
importing the shared information interactively through an end-user import system, and
importing the shared information as a batch operation.

15. The method of claim 1, wherein
the external source comprises one or more fields,
data of the external source is simultaneously mapped and imported into a file, and
the file comprises information regarding the one or more transactions.

16. The method of claim 1, wherein
said importing comprises at least one of
importing the shared information interactively through an end-user import system, and
importing the shared information as a batch operation.

17. The method of claim 1, wherein the shared information is shared according to a hierarchy and predefined territories.

18. A system comprising:
a display device;
a processor, coupled to a network and the display device, and configured to provide shared information regarding a transaction, wherein
the transaction comprises one or more deals, one or more contacts, and one or more accounts, and
the one or more deals are associated with the one or more contacts and the one or more accounts,
import the shared information regarding the transaction from an external source, wherein
the shared information is imported into shared information tables,
generate, from the shared information tables, an event characteristics table, wherein
the event characteristics table comprises one or more data items generated from the shared information contained in the shared information tables,
each of the one or more data items is associated with one or more of the deals,
the one or more data items are used to generate one or more display objects for a graphical display on the display device,
each of the one or more display objects represents a deal of the one or more deals, and
display characteristics of each display object graphically indicate characteristics of the deal.

19. The system of claim 18, wherein
the processor is further configured to
gather the shared information from the external source, and
write the shared information to the shared information tables, according to an import template, wherein
the import template indicates import parameters that are used to translate the shared information into records of the shared information tables.

20. A system comprising:
shared information regarding a transaction, wherein
the shared information regarding the transaction comprises information regarding one or more deals, one or more contacts, and one or more accounts,
the one or more deals are associated with the one or more contacts and the one or more accounts,
the shared information is imported from an external source, and
the shared information is imported into shared information tables;
an event characteristics table, wherein
the event characteristics table is generated from the shared information tables,
the event characteristics table comprises one or more data items generated from the shared information contained in the shared information tables,
each of the one or more data items is associated with one or more of the deals,
the one or more data items are used to generate one or more display objects for a graphical display,
each of the one or more display objects represents a deal of the one or more deals, and
display characteristics of each display object graphically indicate characteristics of the deal; and
a network coupled to the system, wherein
the shared information is transmitted over the network.

21. A non-transitory computer readable medium comprising:
- a first set of instructions, executable in a processing system, configured to provide, over a network, shared information regarding a transaction, wherein
  - the shared information regarding the transaction comprises information regarding one or more deals, one or more contacts, and one or more accounts, and
  - the one or more deals are associated with the one or more contacts and the one or more accounts;
- a second set of instructions, executable in the processing system, configured to automatically import on a periodic basis the shared information regarding the transaction from an external source, wherein
  - the shared information is imported into shared information tables
- a third set of instructions, executable in the processing system, configured to generate, from the imported shared information tables, an event characteristics table, wherein
  - the event characteristics table comprises one or more data items generated from the shared information contained in the shared information tables,
  - each of the one or more data items is associated with one or more of the deals,
  - the one or more data items are used to generate one or more display objects for a graphical display,
  - each of the one or more display objects represents a deal of the one or more deals, and
  - display characteristics of each display object graphically indicate characteristics of the deal.

22. The non-transitory computer readable medium of claim 21, wherein the second set of instructions further comprises:
- a fourth set of instructions, executable in the processing system, configured to import the shared information interactively through an end-user import system;
- a fifth set of instructions, executable in the processing system, configured to import the shared information as a batch operation; and
- a sixth set of instructions, executable in the processing system, configured to gather the shared information from the external source, and
  - write the shared information to the shared information tables according to an import template, wherein
    - the import template indicates import parameters that are used to translate the shared information into records of the shared information tables.

* * * * *

UNITED STATES PATENT AND TRADEMARK OFFICE
CERTIFICATE OF CORRECTION

PATENT NO. : 8,296,173 B2
APPLICATION NO. : 12/047920
DATED : October 23, 2012
INVENTOR(S) : Raffel et al.

It is certified that error appears in the above-identified patent and that said Letters Patent is hereby corrected as shown below:

Title Page, Item (56) under "Other Publications", line 2, delete "Newsire." and insert -- Newswire. --, therefor.

Title Page, Item (56) under "Other Publications", line 2, delete "2998" and insert -- 1998 --, therefor.

Signed and Sealed this
Fifth Day of February, 2013

Teresa Stanek Rea
*Acting Director of the United States Patent and Trademark Office*